United States Patent
Tanno et al.

(10) Patent No.: US 8,265,031 B2
(45) Date of Patent: Sep. 11, 2012

(54) BASE STATION AND BROADCAST CHANNEL TRANSMISSION METHOD

(75) Inventors: Motohiro Tanno, Yokohama (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 365 days.

(21) Appl. No.: 12/663,994

(22) PCT Filed: Jun. 16, 2008

(86) PCT No.: PCT/JP2008/061003
§ 371 (c)(1),
(2), (4) Date: Mar. 23, 2010

(87) PCT Pub. No.: WO2008/156066
PCT Pub. Date: Dec. 24, 2008

(65) Prior Publication Data
US 2010/0177697 A1      Jul. 15, 2010

(30) Foreign Application Priority Data

Jun. 19, 2007  (JP) .................................. 2007-161947
Aug. 14, 2007  (JP) .................................. 2007-211599

(51) Int. Cl.
*H04L 5/22* (2006.01)
(52) U.S. Cl. ....................................................... 370/330
(58) Field of Classification Search .......... 370/328–330, 370/478; 455/422.1, 450, 464, 509, 524–525
See application file for complete search history.

(56) References Cited

U.S. PATENT DOCUMENTS

2007/0093253 A1* 4/2007 Lindoff et al. ................ 455/450

FOREIGN PATENT DOCUMENTS

| EP | 1 976 167 A1 | 10/2008 |
|---|---|---|
| JP | 2010-526470 T | 7/2010 |
| WO | 01/39386 A1 | 5/2001 |
| WO | 2007/083555 A1 | 7/2007 |
| WO | 2008136574 A1 | 11/2008 |

OTHER PUBLICATIONS

International Search Report w/translation from PCT/JP2008/061003 dated Aug. 5, 2008 (4 pages).
Written Opinion from PCT/JP2008/061003 dated Aug. 5, 2008 (5 pages).

(Continued)

*Primary Examiner* — Derrick Ferris
*Assistant Examiner* — Mang Yeung
(74) *Attorney, Agent, or Firm* — Osha Liang LLP

(57) ABSTRACT

A disclosed base station transmits a broadcast channel to a user device a predefined number of times in a predetermined cycle for communication with the user device. The base station includes a repetition unit configured to repeat the broadcast channel, after the broadcast channel is channel-coded, for the predefined number of times to generate multiple broadcast channels; and a signal waveform changing unit configured to process the generated broadcast channels such that the processed broadcast channels have different signal waveforms. Positions of the broadcast channels in the order of transmission in the predetermined cycle are associated with the signal waveforms of the broadcast channels.

10 Claims, 25 Drawing Sheets

OTHER PUBLICATIONS

3GPP TSG RAN WG1 Meeting #49bis, R1-072943; "BCH Structure for E-UTRA Downlink"; NTT DoCoMo, Inc. et al.; Orlando, USA; Jun. 25-29, 2007 (8 pages).
Tanno, M. et al.; "Evolved UTRA Kudari Link ni Okeru Hochi Channel no Saiteki Soshinho"; Proceedings of the 2007 IEICE Society Conference 1; Aug. 29, 2007 (with partial translation) (6 pages).
3GPP TSG RAN WG1 Meeting #50, R1-073685; "Usage of Remaining Resource Elements in Resource Blocks Multiplexed with PBCH and SCH"; NTT DoCoMo, Inc. et al.; Athens, Greece; Aug. 20-24, 2007 (2 pages).
Kishiyama, Y. et al.; "OFDM o Mochiiru Evolved UTRA Kudari Link ni Okeru Hachi Channel Kosei no Kento" (translated as Investigations on Broadcast Channel Structure in OFDM-Based Evolved UTRA Downlink); IEICE Technical Report; vol. 106, No. 360; Nov. 9, 2006; RCS2006-171; pp. 83-87 (7 pages).
3GPP TSG RAN WG1 Meeting #48, R1-070751; "Location of SCH and P-BCH"; ETRI, St. Louis, USA; Feb. 12-16, 2007 (8 pages).
3GPP TSG RAN WG1 Meeting #48bis; R1-071515; "Reference Signal for P-BCH reception with enhancement techniques"; Toshiba Corporation, St. Julian, Malta; Mar. 26-30, 2007 (7 pages).
3GPP TSG RAN WG1 #49 Meeting, R1-072264; "Primary BCH performance; coverage and detection"; Nokia Siemens Networks et al.; Kobe, Japan; May 7-11, 2007 (6 pages).
3GPP Tr 25.814 v.7.0.0, "Physical layer aspects for evolved Universal Terrestrial Radio Access (UTRA)"; Jun. 2006 (126 pages).
3GPP TSG RAN WG Meeting #47bis, R1-070103; "Downlink L1/L2 Control Signaling Channel Structure: Coding"; Sorrento, Italy; Jan. 15-19, 2007 (17 pages).
3GPP TSG RAN WG2#58, R2-072183; "System Information"; Kobe, Japan; May 7-11, 2007 (3 pages).
Office Action in Japanese Patent Application No. 2007-211599 mailed Oct. 12, 2010, with partial English translation thereof (4 pages).
3GPP TSG WG1 Meeting #48 bis R1-071616, ETRI, "P-BCH Performance Improvement Using Soft Combining", St. Julians Malta, Mar. 26, 2007 (4 pages).
Office Action for Russian Application No. 2009149105/07 mailed Jan. 23, 2012, with English translation thereof (8 pages).
Japanese Office Action for Application No. 2007-211599, mailed on Jan. 18, 2011 (5 pages).

* cited by examiner

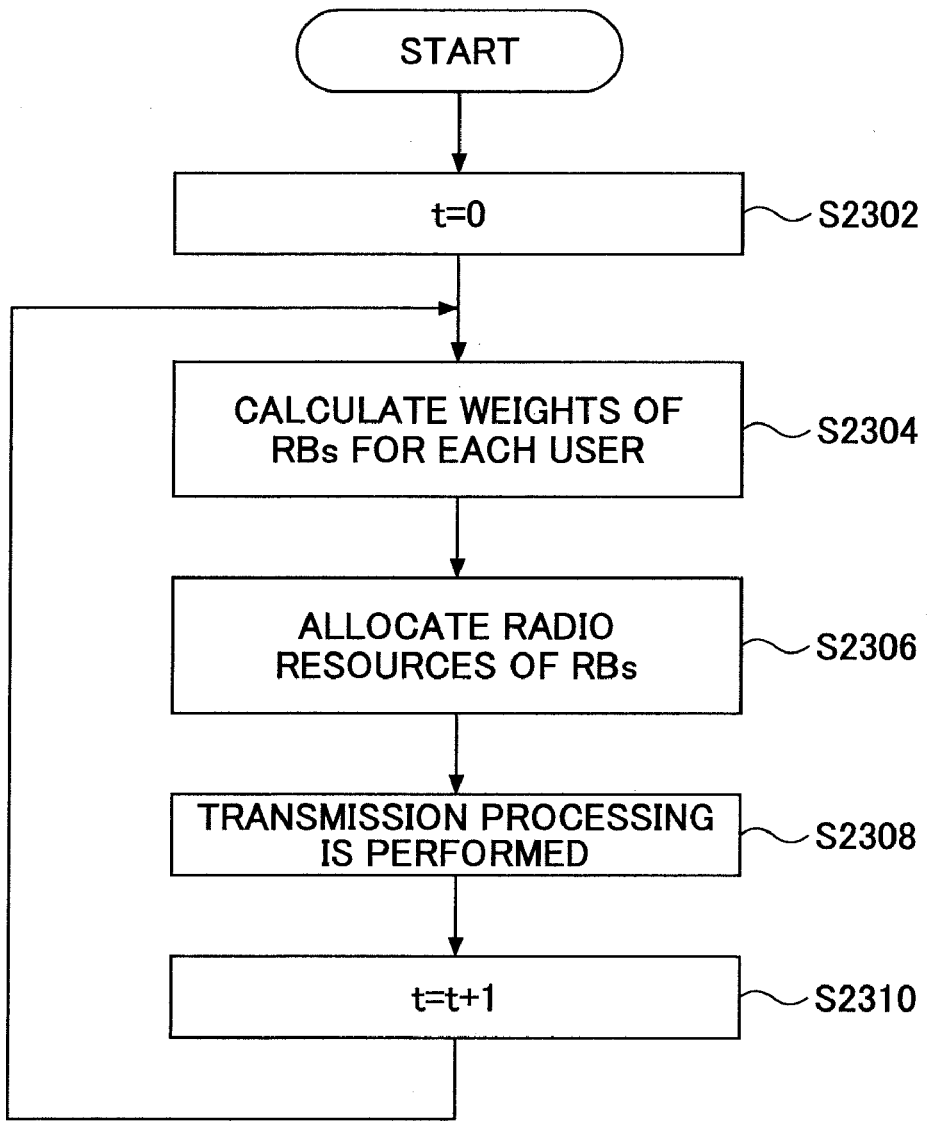

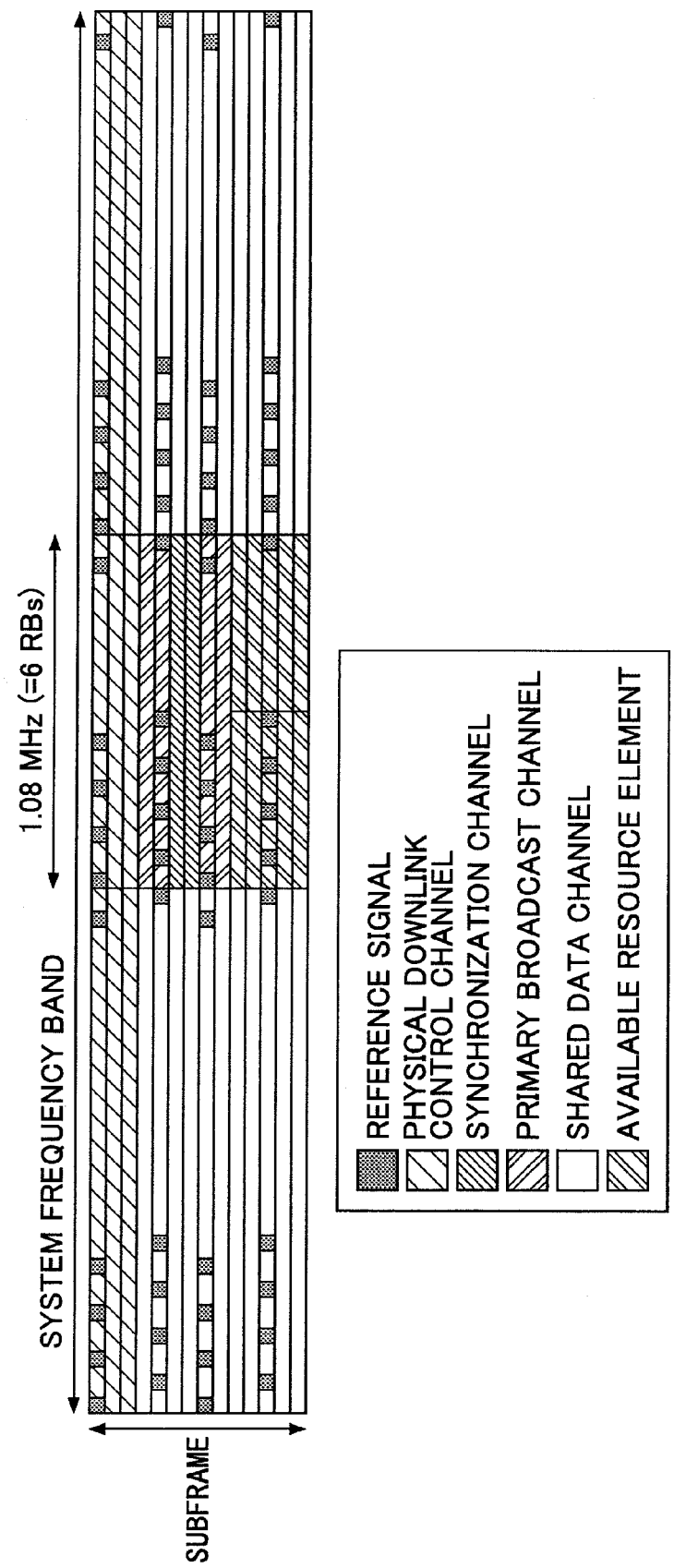

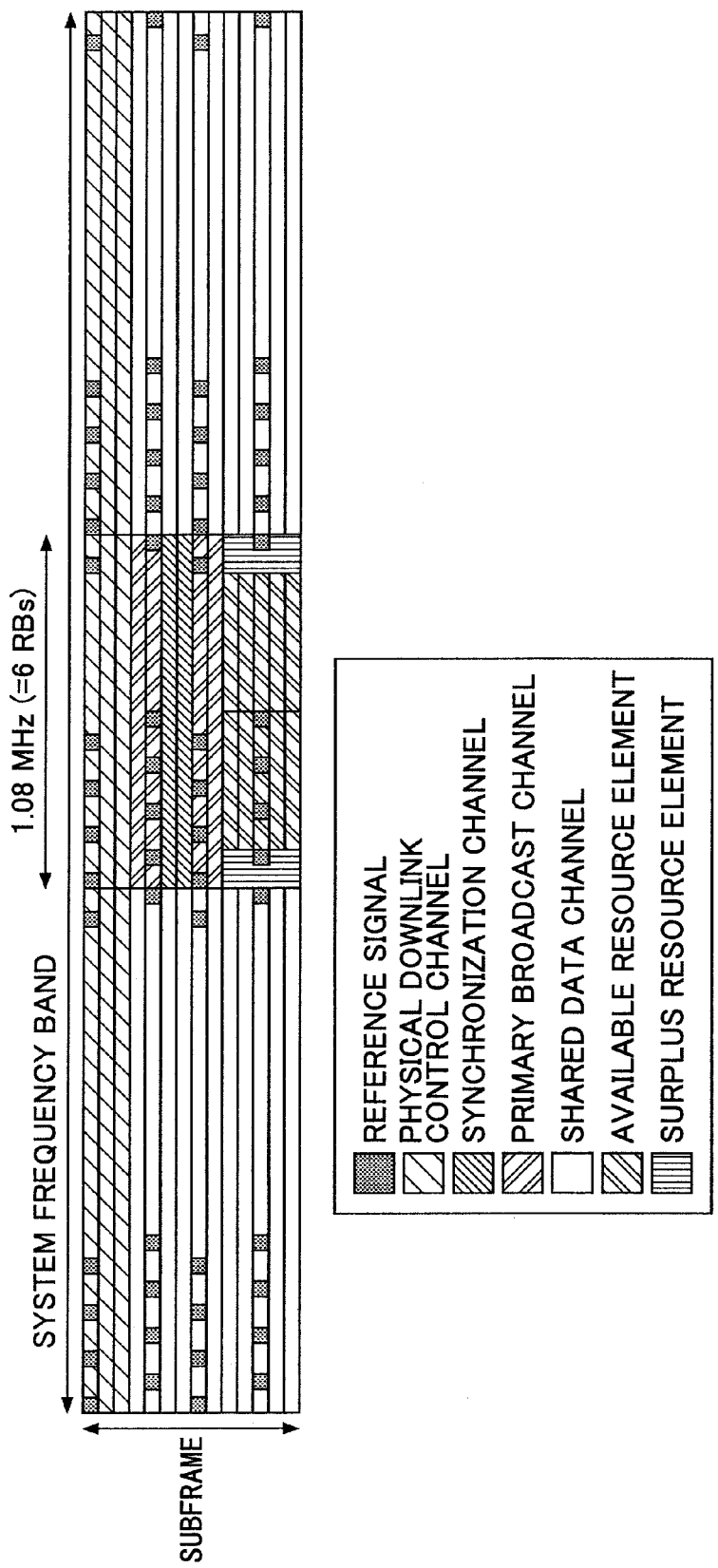

BASE STATION AND BROADCAST CHANNEL TRANSMISSION METHOD

TECHNICAL FIELD

The present invention generally relates to a radio communication system. More particularly, the present invention relates to a base station and a broadcast channel transmission method.

BACKGROUND ART

A successor communication system to W-CDMA and HSDPA, i.e., Long Term Evolution (LTE), is currently being discussed by 3GPP, a standardization group for W-CDMA. In LTE, orthogonal frequency division multiplexing (OFDM) is to be used as a downlink radio access method and single-carrier frequency division multiple access (SC-FDMA) is to be used as an uplink radio access method (see, for example, 3GPP TR 25.814 (V7.0.0), "Physical Layer Aspects for Evolved UTRA," June 2006).

In OFDM, a frequency band is divided into multiple narrow frequency bands (subcarriers) and data are transmitted on the subcarriers. The subcarriers are densely arranged along the frequency axis such that they partly overlap each other but do not interfere with each other. This method enables high-speed transmission and improves frequency efficiency.

In SC-FDMA, a frequency band is divided into multiple frequency bands and the frequency bands are allocated to different terminals for transmission in order to reduce interference between the terminals. Also, SC-FDMA reduces variation of the transmission power and therefore makes it possible to reduce power consumption of terminals and to achieve wide coverage.

In uplink and downlink of LTE, one or more physical channels are shared by multiple user devices for communication. A channel shared by multiple mobile stations is generally called a shared channel. In LTE, a physical uplink shared channel (PUSCH) is used for uplink and a physical downlink shared channel (PDSCH) is used for downlink.

In a communication system employing shared channels, it is necessary to signal allocation information of the shared channels to user devices for each subframe (1 ms in LTE). In LTE, a control channel used to signal the allocation information is called a physical downlink control channel or a downlink (DL) L1/L2 control channel. The physical downlink control channel, for example, includes downlink (DL) scheduling information, acknowledgement information (ACK/NACK), an uplink (UL) scheduling grant, an overload indicator, and a transmission power control command bit (see, for example, R1-070103, Downlink L1/L2 Control Signaling Channel Structure Coding).

Meanwhile, broadcast channels include a first broadcast channel (primary broadcast channel (P-BCH)) and a dynamic broadcast channel (D-BCH).

The primary broadcast channel is transmitted using a fixed transmission method as in the case of a broadcast channel in W-CDMA. The primary broadcast channel is used to report minimum basic information. The dynamic broadcast channel is used to report information other than the information reported by the primary broadcast channel. The dynamic broadcast channel is transmitted via a shared data channel.

There is a consensus to transmit the primary broadcast channel at a cycle of "x" ms, and it has been proposed to set "x" at 40 (see, for example, R2-072183, System Information, May 2007). Also, there is a consensus to transmit the same control information "M" times within the cycle of "x" ms for transmitting the primary broadcast channel, and it has been proposed to set "M" at 2 or 4. Each transmission of the control information is called a burst.

For example, if the primary broadcast channel is to be transmitted four times in a cycle of 40 ms, it means that the primary broadcast channel is transmitted every 10 ms as shown in FIG. 1.

DISCLOSURE OF INVENTION

Problems to be Solved by the Invention

However, the above background art technologies have problems as described below.

Although there is a consensus to transmit the primary broadcast channel at a cycle of "x" ms (hereafter called a primary broadcast channel transmission cycle), it has not been determined how to transmit the primary broadcast channel in the primary broadcast channel transmission cycle. In the primary broadcast channel transmission cycle, the same information is transmitted repeatedly as the primary broadcast channel. When it is necessary to transmit different information, the information to be transmitted is changed at the boundary between primary broadcast channel transmission cycles.

In the example shown in FIG. 1, the primary broadcast channel transmitted every 10 ms in one primary broadcast channel transmission cycle includes the same control information. In this case, the mobile station can detect the boundary between 10 ms intervals in a cell search, but cannot detect the boundary between primary broadcast channel transmission cycles of 40 ms.

Methods for mapping the primary broadcast channel include an "all bits spread over all bursts" method where all bits are spread over all bursts and an "all bits in each burst" method where all bits are transmitted in each burst.

In the "all bits spread over all bursts" method, as shown in FIG. 2, channel coding is performed on the control information of the primary broadcast channel to which an error detecting code (cyclic redundancy check: CRC) is attached. Then, an interleaving process is performed to interleave (or reorder) bits constituting the channel-coded primary broadcast channel, and the interleaved bits are mapped across multiple bursts. When a primary broadcast channel the bits of which are mapped across multiple bursts is transmitted, the mobile station performs blind detection where the primary broadcast channel received at each of all possible timings is decoded and the correct timing is selected based on CRC check results. For example, as shown in FIG. 3, the mobile station receives the primary broadcast channel at each of timings 1 through 4 and checks its CRC. Based on CRC check results, the mobile station selects the correct timing, timing 1 in this example.

With this method, however, the mobile station has to try all four candidate reception timings and therefore it takes time to detect the correct timing. Also, with this method, at a timing (timing 2 in FIG. 3) that is 10 ms away from the correct timing, the CRC check result may become "good" because three of the four bursts received are correct. This may results in low detection accuracy.

In the "all bits in each burst" method, as shown in FIG. 4, channel coding is performed on the control information of the primary broadcast channel to which an error detecting code (cyclic redundancy check: CRC) is attached. The channel-coded primary broadcast channel is repeated (or duplicated) to generate, for example, four channel-coded primary broadcast channels (bursts), and an interleaving process is performed to interleave (or reorder) bits constituting each of the channel-coded primary broadcast channels. Then, the interleaved bits are mapped. When a primary broadcast channel all of the bits of which are mapped in each burst is transmitted, the mobile station can obtain information by just receiving one primary broadcast channel. Thus, this method makes it possible to reduce the delay in reception processing. With this method, however, the mobile station cannot detect the primary broadcast channel transmission cycle.

One object of the present invention is to solve or reduce one or more of the above problems and to provide a base station and a broadcast channel transmission method that enable a user device to detect a transmission cycle of a broadcast channel while reducing the time necessary to receive the broadcast channel.

Means for Solving the Problems

An aspect of the present invention provides a base station that transmits a broadcast channel to a user device a predefined number of times in a predetermined cycle for communication with the user device. The base station includes a repetition unit configured to repeat the broadcast channel, after the broadcast channel is channel-coded, for the predefined number of times to generate multiple broadcast channels; and a signal waveform changing unit configured to process the generated broadcast channels such that the processed broadcast channels have different signal waveforms. Positions of the broadcast channels in the order of transmission in the predetermined cycle are associated with the signal waveforms of the broadcast channels.

Another aspect of the present invention provides a method of transmitting a broadcast channel by a base station to a user device for communication with the user device where the broadcast channel is transmitted a predefined number of times in a predetermined cycle. The method includes a repetition step of repeating the broadcast channel, after the broadcast channel is channel-coded, for the predefined number of times to generate multiple broadcast channels; and a signal waveform changing step of processing the generated broadcast channels such that the processed broadcast channels have different signal waveforms that are associated with positions of the broadcast channels in the order of transmission in the predetermined cycle.

Advantageous Effect of the Invention

Aspects of the present invention provide a base station and a broadcast channel transmission method that enable a user device to detect a transmission cycle of a broadcast channel while reducing the time necessary to receive the broadcast channel.

BRIEF DESCRIPTION OF THE DRAWINGS

FIG. 23 is a flowchart showing a scheduling process at a base station according to an embodiment of the present invention;

FIG. 24 is a drawing illustrating exemplary subframe mapping according to an embodiment of the present invention; and FIG. 25 is a drawing illustrating exemplary subframe mapping according to an embodiment of the present invention.

Figure 1:
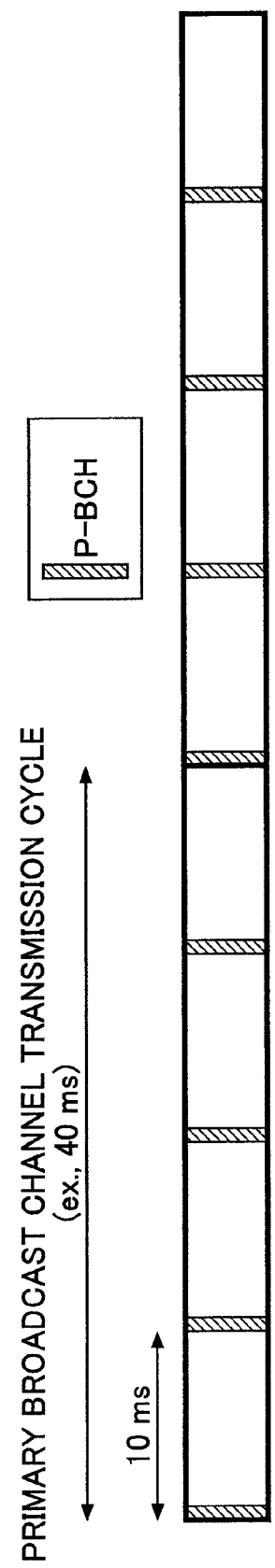
FIG. 1 is a drawing illustrating an exemplary method of transmitting a primary broadcast channel.
Figure 2:
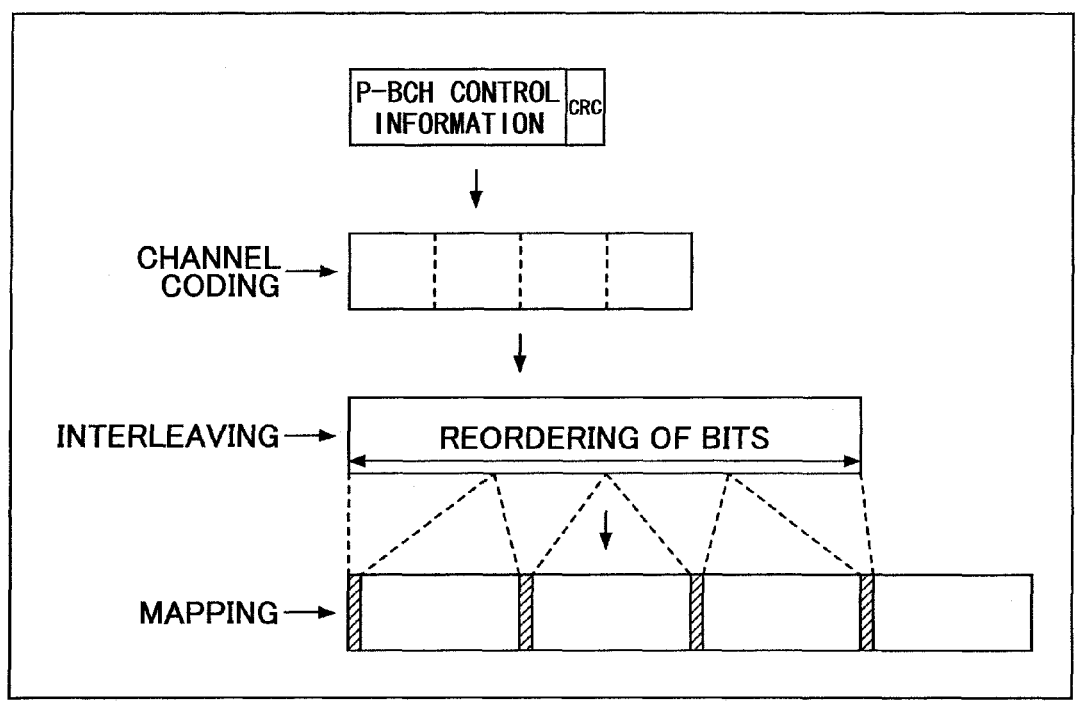
FIG. 2 is a drawing illustrating an exemplary method of mapping a primary broadcast channel.
Figure 3:
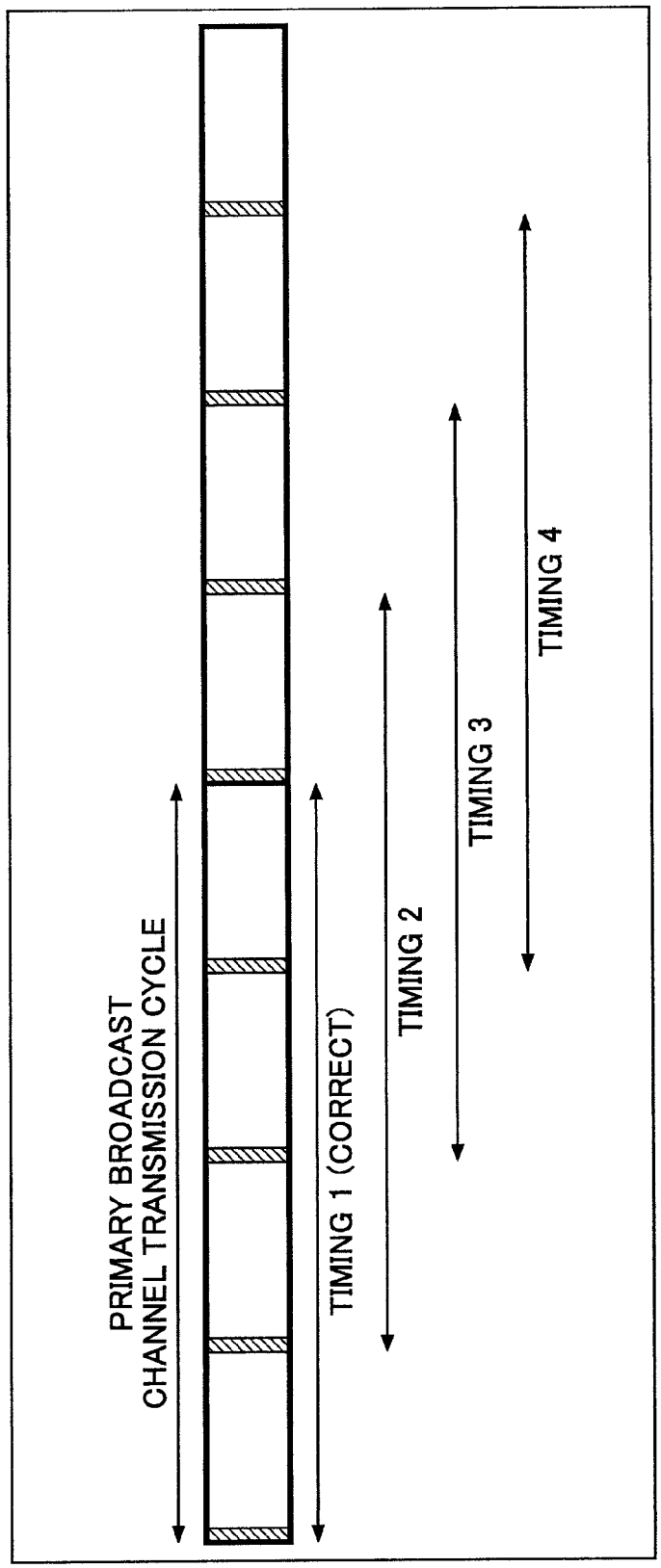
FIG. 3 is a drawing illustrating an exemplary method of receiving a primary broadcast channel.
Figure 4:
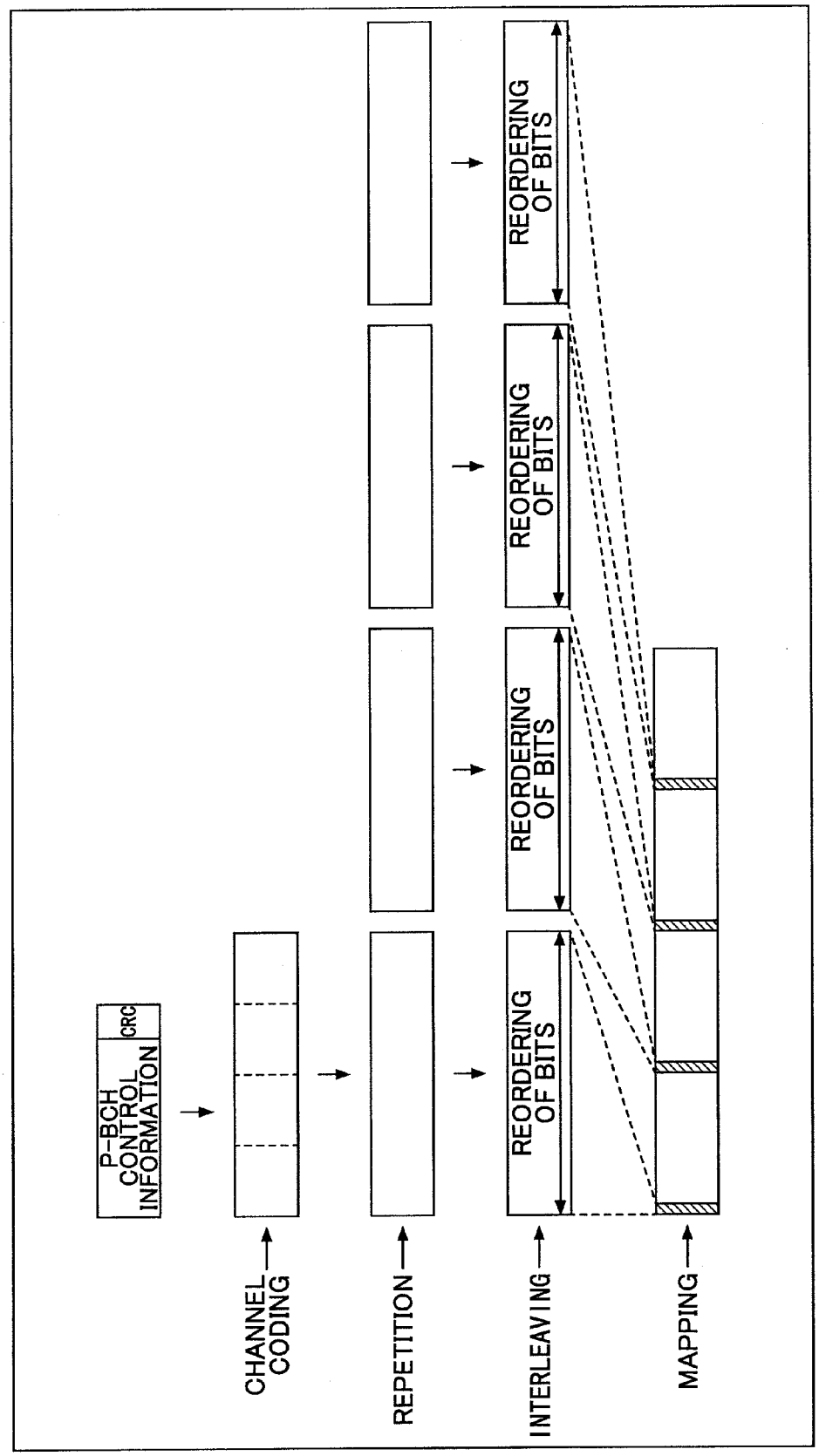
FIG. 4 is a drawing illustrating an exemplary method of mapping a primary broadcast channel.

EXPLANATION OF REFERENCES $50_k$ ($50_1$, $50_2$, $50_3$) Cell
$100_n$ ($100_1$, $100_2$, $100_3$, $100_4$, $100_5$) User device
$200m$ ($200_1$, $200_2$, $200_3$) Base station
202 BCH control information generating unit
204 Channel coding unit
206 Repetition unit
208 Interleaving unit
210 Data modulation unit
212 Scrambling unit
214 Multiplexing-and-mapping unit
216 OFDM modulation unit
218 RF transmission unit
220 P-BCH transmission method control unit
222 Repetition-and-puncturing unit
224 Scheduler
300 Access gateway
400 Core network
1000 Radio communication system

BEST MODE FOR CARRYING OUT THE INVENTION

Embodiments of the present invention are described below with reference to the accompanying drawings. Throughout the accompanying drawings, the same reference numbers are used for parts having the same functions, and overlapping descriptions of those parts are omitted.

Figure 5:
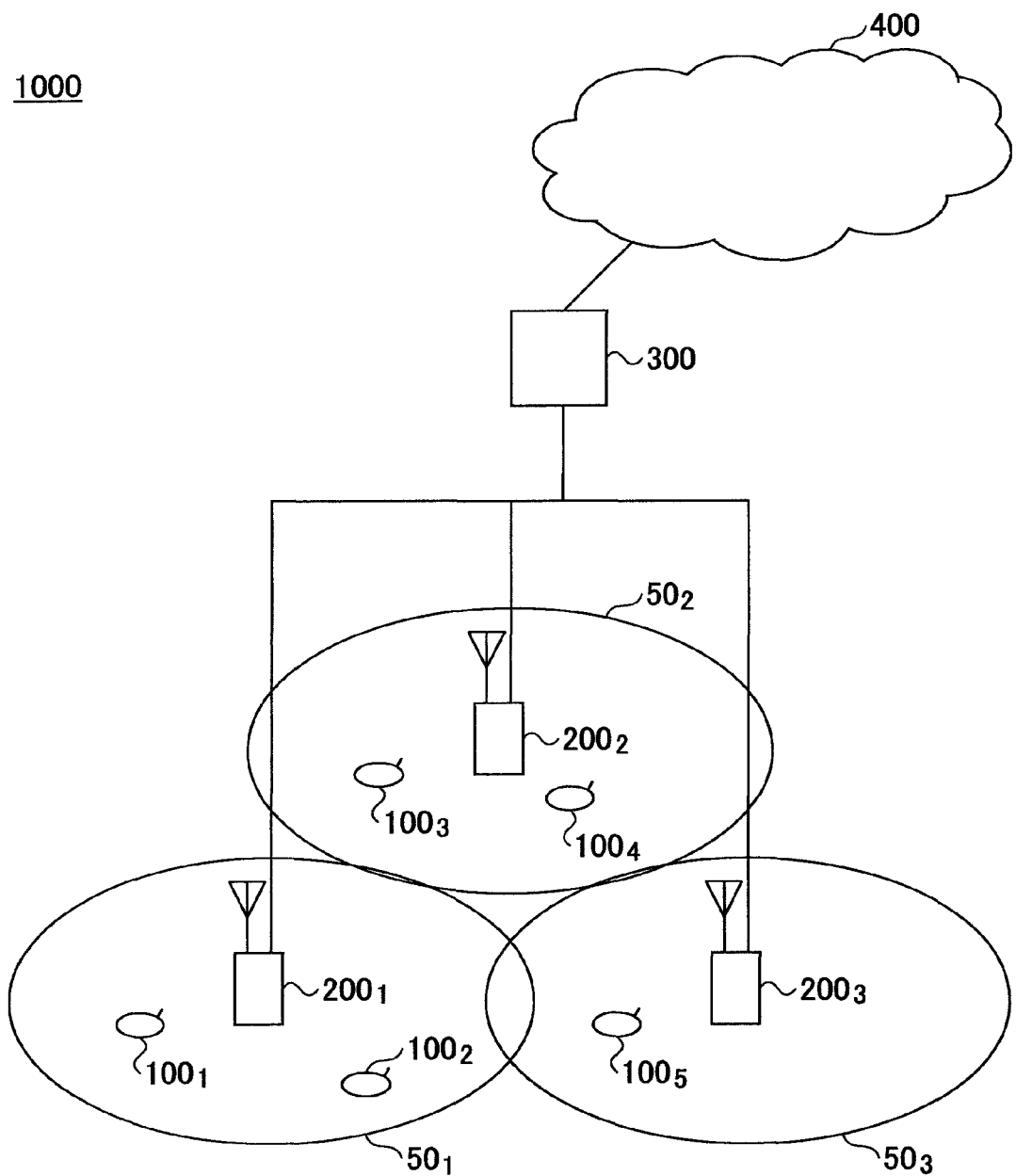
FIG. 5 is a drawing illustrating a configuration of a radio communication system according to an embodiment of the present invention.

A radio communication system 1000 including mobile stations and base stations according to an embodiment of the present invention is described below with reference to FIG. 5.

The radio communication system 1000 is based on, for example, Evolved UTRA and UTRAN (also called Long Term Evolution or Super 3G). The radio communication system 1000 includes base stations (eNode B: eNB) $200_m$ ($200_1$, $200_2$, $200_3$, $200_m$; m is an integer greater than 0) and mobile stations $100_n$ ($100_1$, $100_2$, $100_3$, ..., $100_n$; n is an integer greater than 0) that communicate with the base stations $200_m$. The base stations $200_m$ are connected to an upper node such as an access gateway 300 and the access gateway 300 is connected to a core network 400. Each of the mobile stations $100_n$ is in one of cells $50_k$ ($50_1$, $50_2$, $50_k$; k is an integer greater than 0) and communicates with the corresponding one of the base stations $200_m$ according to Evolved UTRA and UTRAN.

Some of the mobile stations $100_n$ have already established communication channels with the base stations $200_m$ and are in communications; and the other mobile stations $100_n$ have not established communication channels with the base stations $200_m$ and are not in communications.

Each of the base stations $200_m$ transmits synchronization signals. Each of the mobile stations $100_n$ is located in one of the cells $50_k$ ($50_1$, $50_2$, ..., $50_k$; k is an integer greater than 0). When the mobile station $100_n$ is, for example, turned on or in the intermittent reception mode during communications, the mobile station $100_n$ performs a cell search based on the synchronization signals to find a cell that provides good radio communication quality for the mobile station $100_n$. More specifically, the mobile station $100_n$ detects a symbol timing and a frame timing and detects cell-specific control information such as a cell ID (a scrambling code unique to a cell generated from the cell ID) or a group of cell IDs (hereafter called a cell ID group) based on the synchronization signals.

A cell search may be performed when the mobile station $100_n$ is in communications as well as when the mobile station $100_n$ is not in communications. For example, the mobile station $100_n$ performs a cell search during communications to find a cell using the same frequency or to find a cell using a different frequency. The mobile station $100_n$ also performs a cell search when it is not in communications, for example, when the mobile station $100_n$ has just been turned on or is in the standby mode.

The base stations $200_m$ ($200_1$, $200_2$, $200_3$, ..., $200_m$) have the same configuration and functions and are therefore called the base station 200, the base station $200_m$, or the base stations $200_m$ in the descriptions below unless otherwise mentioned. The mobile stations $100_n$ ($100_1$, $100_2$, $100_3$, ..., $100_n$) have the same configuration and functions and are therefore called the mobile station $100_n$ or the mobile stations $100_n$ (or user device 100) in the descriptions below unless otherwise mentioned. The cells $50_k$ ($50_1$, $50_2$, $50_3$, ..., $50_k$) have the same configuration and functions and are therefore called the cell $50_k$ or the cells $50_k$ in the descriptions below unless otherwise mentioned.

In the radio communication system 1000, orthogonal frequency division multiplexing (OFDM) is used as the downlink radio access method and single-carrier frequency division multiple access (SC-FDMA) is used as the uplink radio access method. In OFDM, as described above, a frequency band is divided into narrow frequency bands (subcarriers) and data are transmitted on the subcarriers. In SC-FDMA, a frequency band is divided into multiple frequency bands and the frequency bands are allocated to different terminals for transmission in order to reduce interference between the terminals.

Communication channels used in Evolved UTRA and UTRAN are described below.

For downlink, a physical downlink shared channel (PDSCH) shared by the mobile stations $100_n$ and an LTE downlink control channel are used. In downlink, the LTE downlink control channel is used to report information on mobile stations to be mapped to the physical downlink shared channel, transport format information for the physical downlink shared channel, information on mobile stations to be mapped to a physical uplink shared channel, transport format information for the physical uplink shared channel, and acknowledgement information for the physical uplink shared channel; and the physical downlink shared channel is used to transmit user data.

Also in downlink, the base stations $200_m$ transmit synchronization signals used by the mobile stations $100_n$ to perform cell searches.

For uplink, a physical uplink shared channel (PUSCH) shared by the mobile stations $100_n$ and an LTE uplink control channel are used. There are two types of uplink control channel: an uplink control channel to be time-division-multiplexed with the physical uplink shared channel and an uplink control channel to be frequency-division-multiplexed with the physical uplink shared channel.

In uplink, the LTE uplink control channel is used to report downlink channel quality indicators (CQI) used for scheduling and adaptive modulation and coding (AMC) of the physical downlink shared channel and to report acknowledgement information (HARQ ACK information) for the physical downlink shared channel; and the physical uplink shared channel is used to transmit user data.

Figure 6:
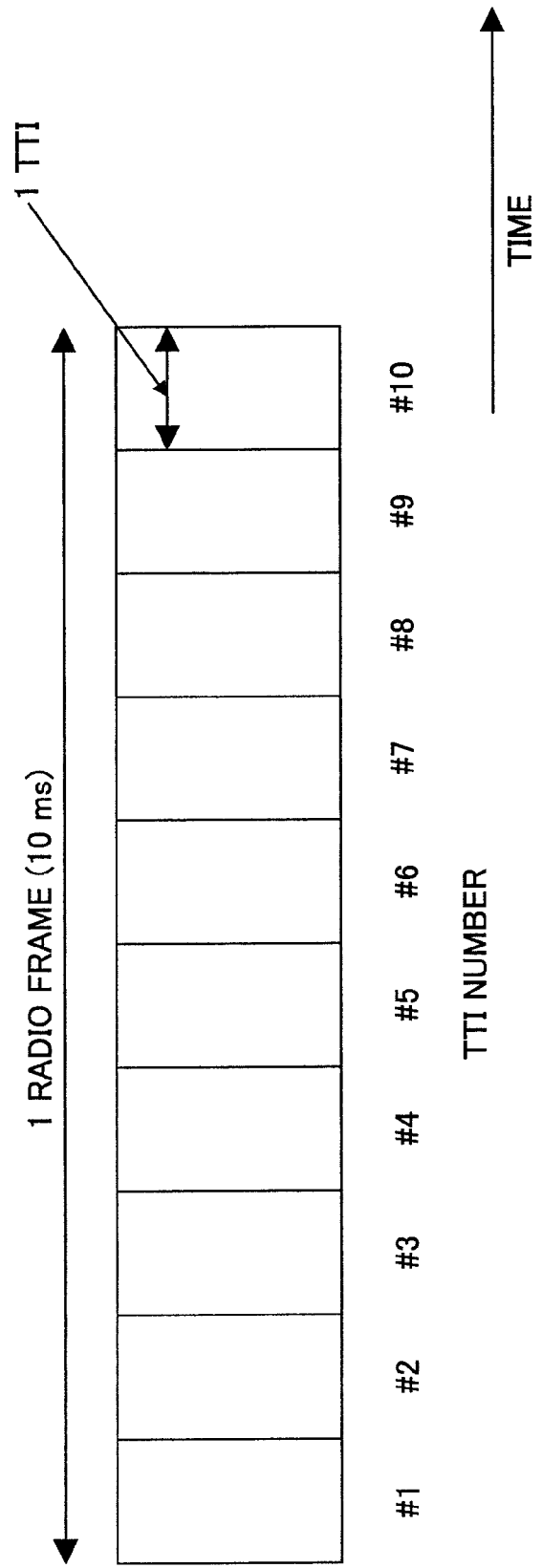
FIG. 6 is a drawing illustrating a radio frame structure.
Figure 7:
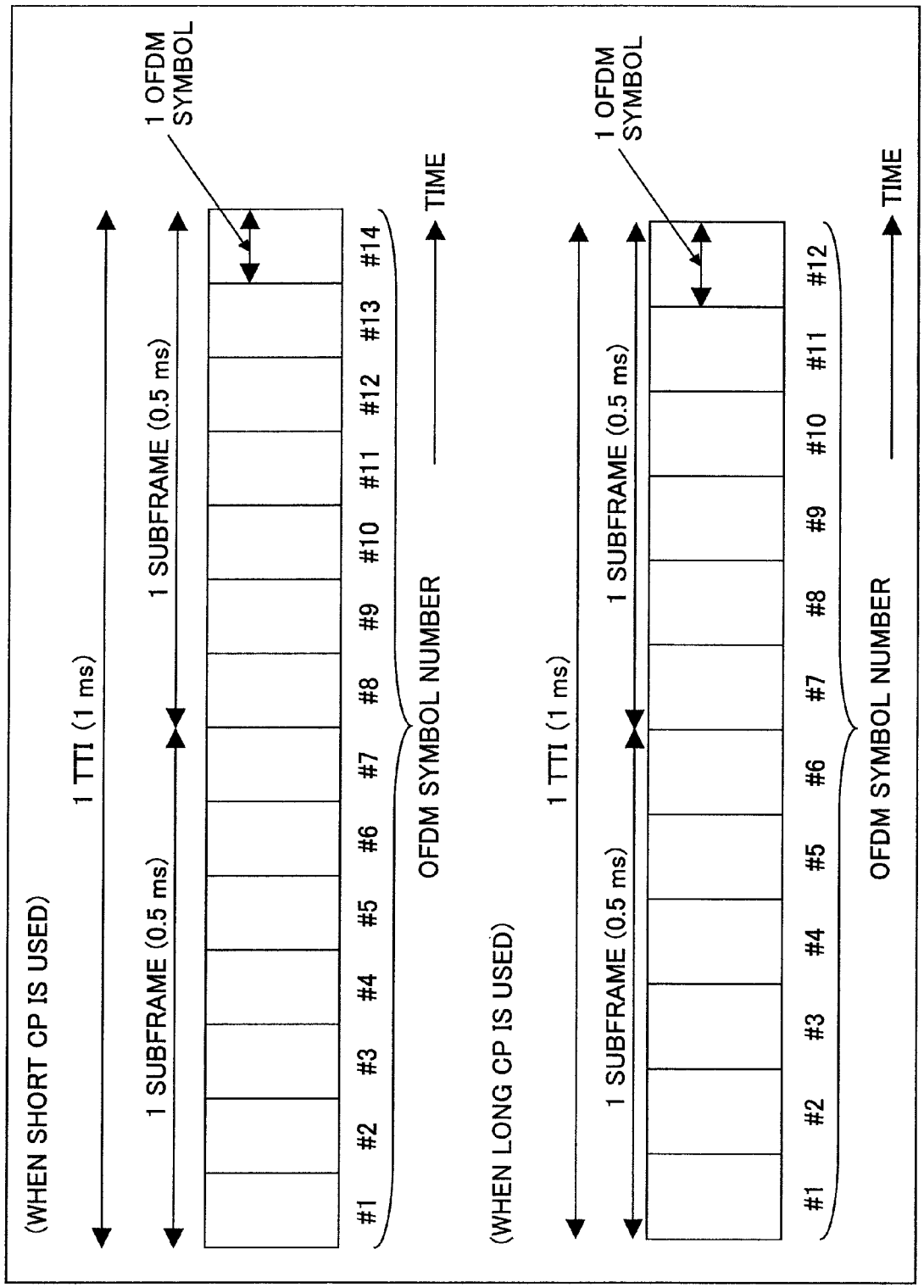
FIG. 7 is a drawing illustrating TTI structures.

In downlink transmission, as shown in FIG. 6, one radio frame is 10 ms and includes 10 TTIs. TTIs may also be called subframes. Also, as shown in FIG. 7, one TTI includes two subframes, and one subframe includes seven OFDM symbols when a short CP is used (upper half of FIG. 7) or six OFDM symbols when a long CP is used (lower half of FIG. 7). When TTIs are called subframes, the subframes shown in FIG. 7 are called slots.

Figure 8:
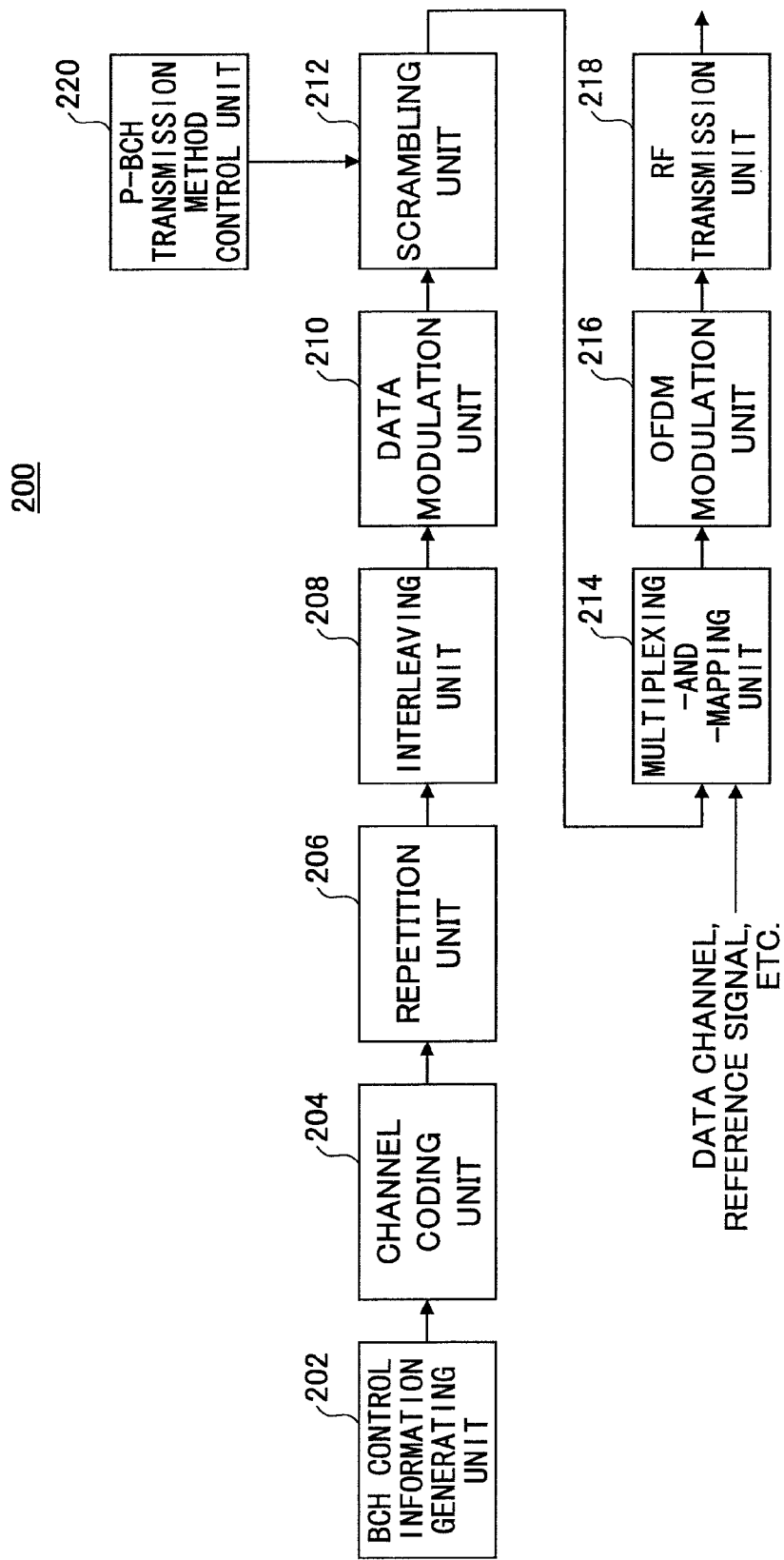
FIG. 8 is a partial block diagram of a base station according to an embodiment of the present invention.

The base station 200 according to a first embodiment of the present invention is described below with reference to FIG. 8.

The base station 200 of this embodiment includes a BCH control information generating unit 202, a channel coding unit 204, a repetition unit 206, an interleaving unit 208, a data modulation unit 210, a scrambling unit 212 used as a spreading unit, a multiplexing-and-mapping unit 214, an OFDM modulation unit 216, an RF transmission unit 218, and a P-BCH transmission method control unit 220.

In this embodiment, it is assumed that the primary broadcast channel is transmitted multiple times in a primary broadcast channel transmission cycle, and the base station 200 transmits respective bursts of the primary broadcast channel using different methods. For example, the base station 200 transmits bursts of the primary broadcast channel with different signal waveforms. In this case, the signal waveforms of the bursts of the primary broadcast channel are associated with positions of the bursts in the order of transmission. For example, the respective bursts of the primary broadcast channel are multiplied by different scrambling codes such that the respective bursts have different signal waveforms. In this embodiment, it is assumed that the primary broadcast channel is transmitted four times in the primary broadcast channel transmission cycle. Alternatively, the number of times the primary broadcast channel is transmitted may be two, three, five, or more.

The BCH control information generating unit 202 generates control information to be transmitted via broadcast channels. The size of the control information is, for example, 40 bits. The broadcast channels include a primary broadcast channel including minimum basic information (primary broadcast channel information) such as system frame numbers (SFN) and a public land mobile network ID (PLMNID); and a dynamic broadcast channel used to transmit information other than the primary broadcast channel information. Descriptions here are mainly related to the primary broadcast channel. The BCH control information generating unit 202 generates control information to be transmitted via the primary broadcast channel for each primary broadcast channel transmission cycle.

The channel coding unit 204 performs channel coding on the control information, i.e., the primary broadcast channel, generated by the BCH control information generating unit 202. For example, the channel coding unit 204 includes a turbo encoder that performs error-correction encoding to attach redundancy bits to information bits of the primary broadcast channel.

The repetition unit 206 repeats (or duplicates) the channel-coded primary broadcast channel for the number of times the primary broadcast channel is to be transmitted in the primary broadcast channel transmission cycle, thereby generates multiple, e.g., four, primary broadcast channels (bursts), and inputs the primary broadcast channels to the interleaving unit 208.

The interleaving unit 208 performs an interleaving process to interleave (or reorder) bits constituting each of the primary broadcast channels according to a predetermined rule, and inputs the interleaved primary broadcast channels to the data modulation unit 210.

The data modulation unit 210 data-modulates the channel-coded and interleaved primary broadcast channels according to a predetermined modulation scheme, and inputs the data-modulated primary broadcast channels to the scrambling (spreading) unit 212.

Meanwhile, the P-BCH transmission method control unit 220 assigns different scrambling codes to the respective bursts of the primary broadcast channel to be transmitted in a primary broadcast channel transmission cycle. For example, assuming that the primary broadcast channel is to be transmitted four times in a primary broadcast channel transmission cycle, the P-BCH transmission method control unit 220 prepares four different scrambling codes. In this case, the scrambling codes are associated in advance with positions of the primary broadcast channels (bursts) in the order of transmission.

The scrambling unit 212 spreads the primary broadcast channels input from the data modulation unit 210 by the corresponding scrambling codes input from the P-BCH transmission method control unit 220, and inputs the spread primary broadcast channels to the multiplexing-and-mapping unit 214.

The multiplexing-and-mapping unit 214 receives the spread primary broadcast channels from the scrambling unit 212 and also receives, for example, a data channel and a reference signal. The multiplexing-and-mapping unit 214 multiplexes the primary broadcast channels, the data channel, and the reference signal.

Figure 9:
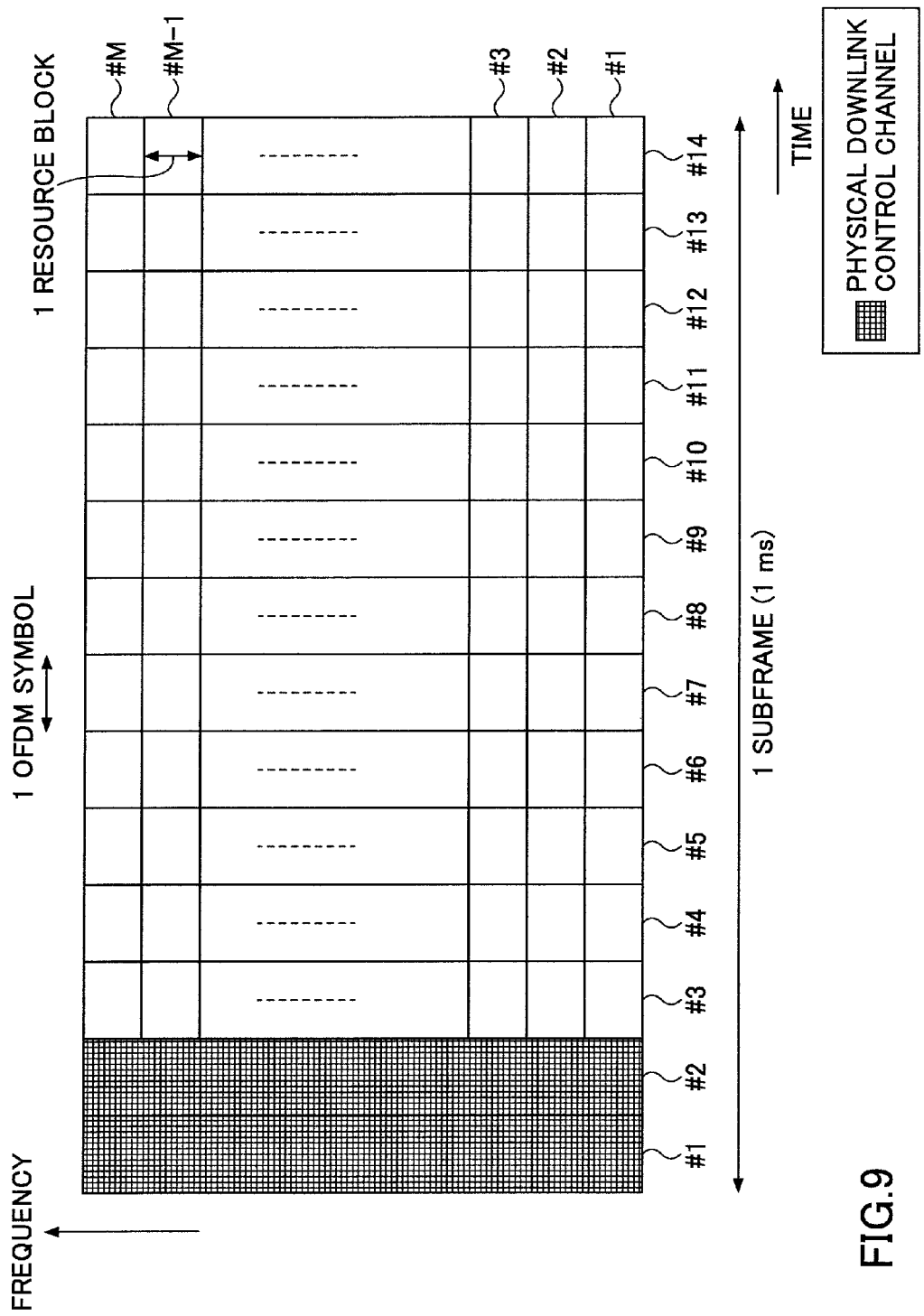
FIG. 9 is a drawing illustrating a subframe structure.

FIG. 9 is a drawing illustrating exemplary mapping of the data channel and control channels. The primary broadcast channel is mapped in the same center frequency band as that where the synchronization channel is mapped. The details of mapping are described later. In downlink transmission, as shown in FIG. 9, one subframe is, for example, 1 ms and includes 14 OFDM symbols. In FIG. 9, numbers (#1, #2, #3, ..., #14) arranged along the time axis identify OFDM symbols, and numbers (#1, #2, #3, ..., #M-1, #M; M is an integer greater than 0) arranged along the frequency axis identify resource blocks.

The physical downlink control channel described above is mapped to first "N" OFDM symbols in a subframe. "N" may take a value of 1, 2, or 3. In the example of FIG. 9, the physical downlink control channel is mapped to the first two OFDM symbols (N=2), i.e., OFDM symbols #1 and #2, in a subframe. OFDM symbols other than those to which the physical downlink control channel is to be mapped are used to transmit user data, a synchronization channel (SCH), a broadcast channel (BCH), and a data signal to which persistent scheduling is applied. The L1/L2 control channel and the data channel are time-division-multiplexed.

In the frequency direction, M resource blocks are defined. The bandwidth of each resource block is, for example, 180 kHz, and each resource block includes 12 subcarriers. The number of resource blocks M is 25 when the system bandwidth is 5 MHz, 50 when the system bandwidth is 10 MHz, or 100 when the system bandwidth is 20 MHz.

Figure 10:
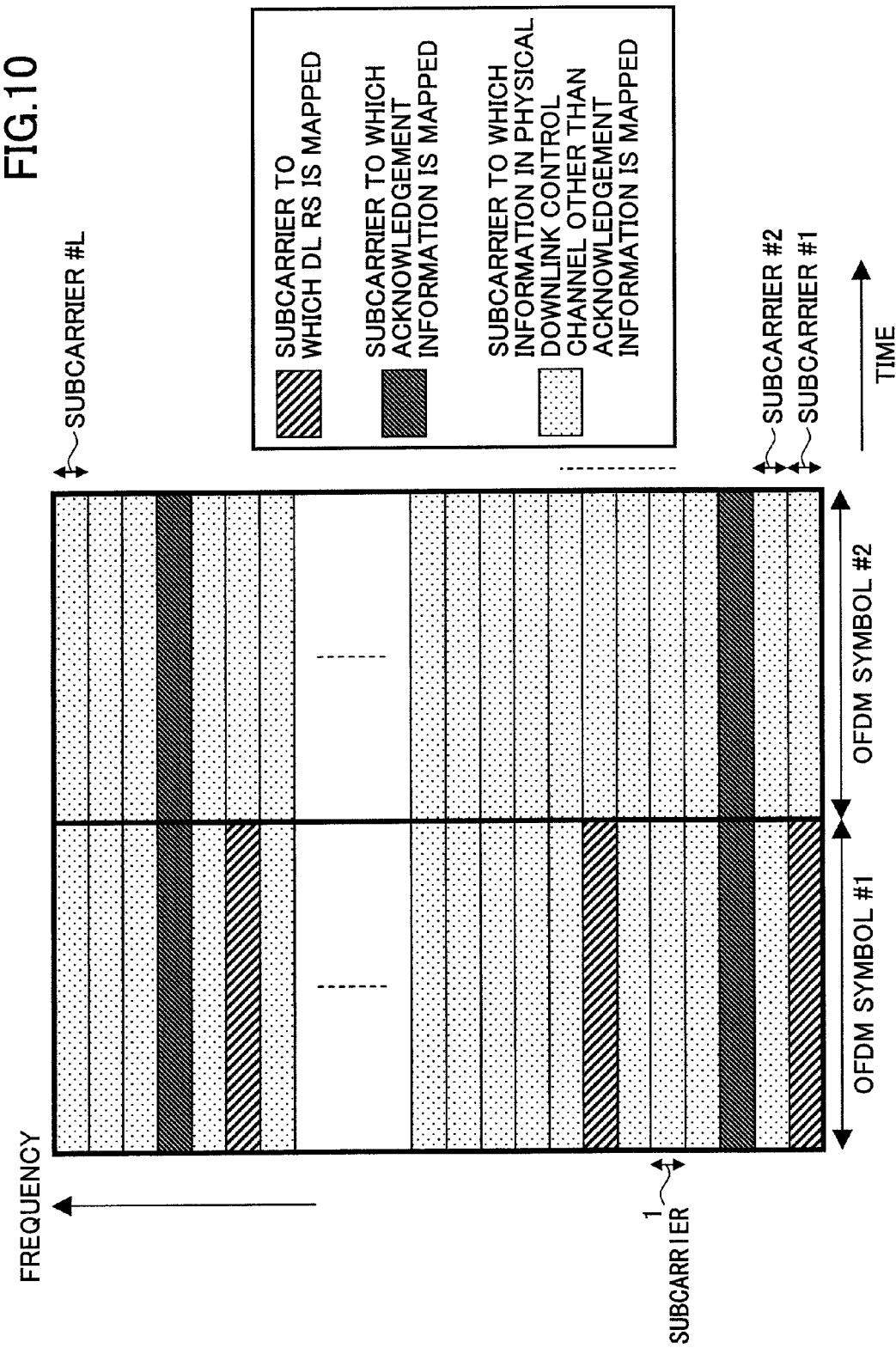
FIG. 10 is a drawing illustrating an example of subcarrier mapping at OFDM symbols #1 and #2.

FIG. 10 is a drawing illustrating an example of subcarrier mapping at OFDM symbols #1 and #2 in a subframe structure as shown in FIG. 9. In FIG. 10, the number of subcarriers for each OFDM symbol is L (L is an integer greater than 0), and reference numbers #1, #2, ..., #L are assigned to the subcarriers in ascending order of frequency. The number of subcarriers L is 300 when the system bandwidth is 5 MHz, 600 when the system bandwidth is 10 MHz, or 1200 when the system bandwidth is 20 MHz. As shown in FIG. 10, a downlink reference signal (DL RS) and the physical downlink control channel are mapped to subcarriers of OFDM symbol #1. The physical downlink control channel is also mapped to OFDM symbol #2. In this example, the L1/L2 control channel and other control channels are frequency-division-multiplexed such that each of the channels is mapped to multiple frequency components arranged at certain intervals. Such a multiplexing scheme is called distributed frequency division multiplexing (FDM). Distributed FDM is preferable to achieve frequency diversity gain. The frequency components allocated to the respective channels may be arranged at the same intervals or at different intervals. In either case, it is necessary to distribute the L1/L2 control channel across all resource blocks (in this embodiment, the entire system frequency band). CDM may also be used as an additional multiplexing scheme to cope with the increase in the number of multiplexed users. CDM makes it possible to further increase the frequency diversity gain. On the other hand, however, CDM may disrupt the orthogonality and reduce the reception quality.

For example, in OFDM symbol #1, one DL RS is transmitted per six subcarriers. In FIG. 10, the DL RS is mapped to subcarriers with reference numbers "6×d−1" (d indicates 1, 2, ...). The physical downlink control channel is mapped to subcarriers other than those to which the DL RS is mapped. In the example shown in FIG. 10, acknowledgement information (UL ACK/NACK) to be transmitted via the physical downlink control channel is mapped to subcarrier #3 and subcarrier #L-3. The number of subcarriers to which the acknowledgement information is mapped is determined by the maximum number of user devices multiplexed in one subframe in uplink, i.e., the maximum number of user devices that transmit uplink shared channels in one subframe.

In a case where the physical downlink control channel is mapped to three OFDM symbols, the configuration of OFDM symbol #3 is substantially the same as that of OFDM symbol #2.

The OFDM modulation unit 216 OFDM-modulates a signal where the data channel, the reference signal, and the L1/L2 control channel are multiplexed.

The RF transmission unit 218 attaches CPs to the signal where the data channel, the reference signal, and the L1/L2 control channel are multiplexed, performs digital-analog conversion, frequency conversion, and band limitation on the signal, amplifies the signal to an appropriate power level, and then transmits the signal.

Figure 11:
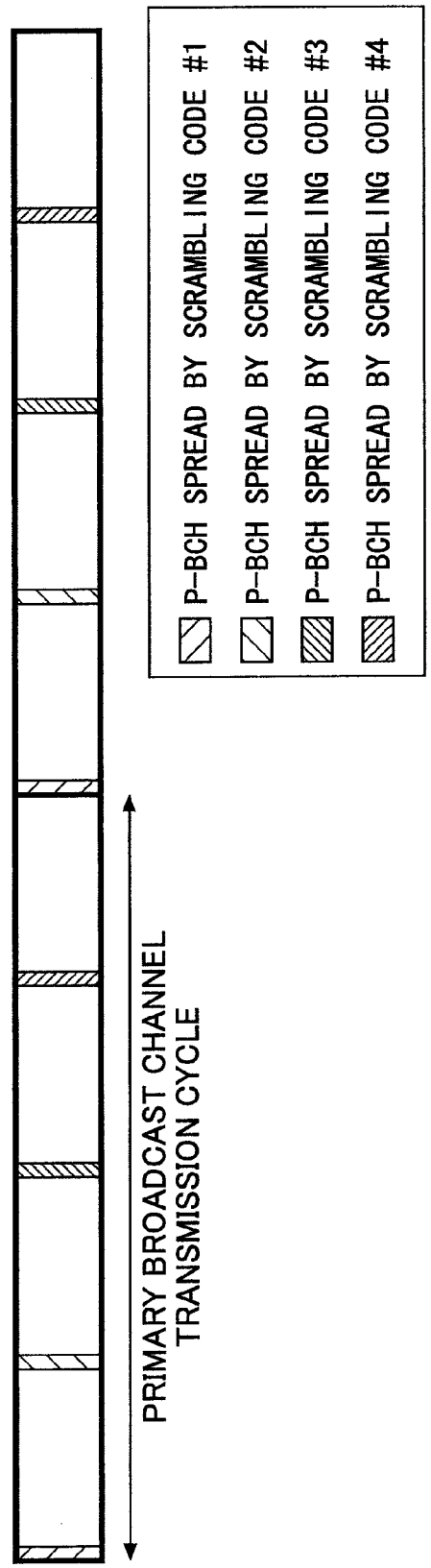
FIG. 11 is a drawing illustrating an exemplary method of transmitting a primary broadcast channel according to an embodiment of the present invention.

As a result, as shown in FIG. 11, multiple, e.g., four, primary broadcast channels spread by different scrambling codes are transmitted (i.e., the primary broadcast channel is transmitted four times) in a primary broadcast channel transmission cycle. Thus, it is possible to vary signal waveforms of primary broadcast channels to be transmitted in a primary broadcast channel transmission cycle by spreading the primary broadcast channels with different scrambling codes.

The user device 100 demodulates the primary broadcast channel by blind detection where all predefined scrambling codes are tried to decode the primary broadcast channel. Since multiple primary broadcast channels (bursts) are transmitted in a primary broadcast channel transmission cycle by the "all bits in each burst" method, the user device 100 can obtain primary broadcast channel information by receiving just one primary broadcast channel, i.e., without receiving other primary broadcast channels. This method makes it possible to reduce the time necessary to receive the primary broadcast channel. Also, this method makes it possible to detect the position of a primary broadcast channel in the order of transmission by receiving only that one primary broadcast channel and thereby to detect the boundary between primary broadcast channel transmission cycles.

In related-art technologies, system frame numbers are assigned to respective frames. In the example shown in FIG. 11, system frame numbers #1-#8 are assigned to frames and therefore it is necessary to transmit three information bits to report a system frame number. According to this embodiment, since frames #1-#4 can be identified by a method based on blind detection, it is necessary to transmit only one information bit. Thus, this embodiment makes it possible to reduce the number of information bits necessary to report system frame numbers.

The user device 100 has to receive broadcast channels even in the standby mode. This embodiment allows the user device 100 to obtain primary broadcast channel information by just receiving one primary broadcast channel, i.e., without receiving other primary broadcast channels. In other words, this embodiment eliminates the need for the user device 100 to perform reception processing throughout the primary broadcast channel transmission cycle. This in turn makes it possible to save battery energy. Meanwhile, using different transmission methods for respective bursts of the primary broadcast channel in a primary broadcast channel transmission cycle makes it possible to achieve diversity gain if the bursts are to be combined after reception.

Since the primary broadcast channel is transmitted multiple times in a primary broadcast channel transmission cycle, the transmission power level of each burst of the primary broadcast channel becomes low. For this reason, a user device at a cell edge may obtain primary broadcast channel information by soft-combining multiple bursts of the primary broadcast channel transmitted in a primary broadcast channel transmission cycle. On the other hand, a user device near the center of the cell can obtain primary broadcast channel information without soft-combining multiple bursts of the primary broadcast channel transmitted in a primary broadcast channel transmission cycle.

The user device 100 may be configured to try adjacent scrambling codes in blind detection where all predefined scrambling codes are tried to decode the primary broadcast channel.

Figure 12:
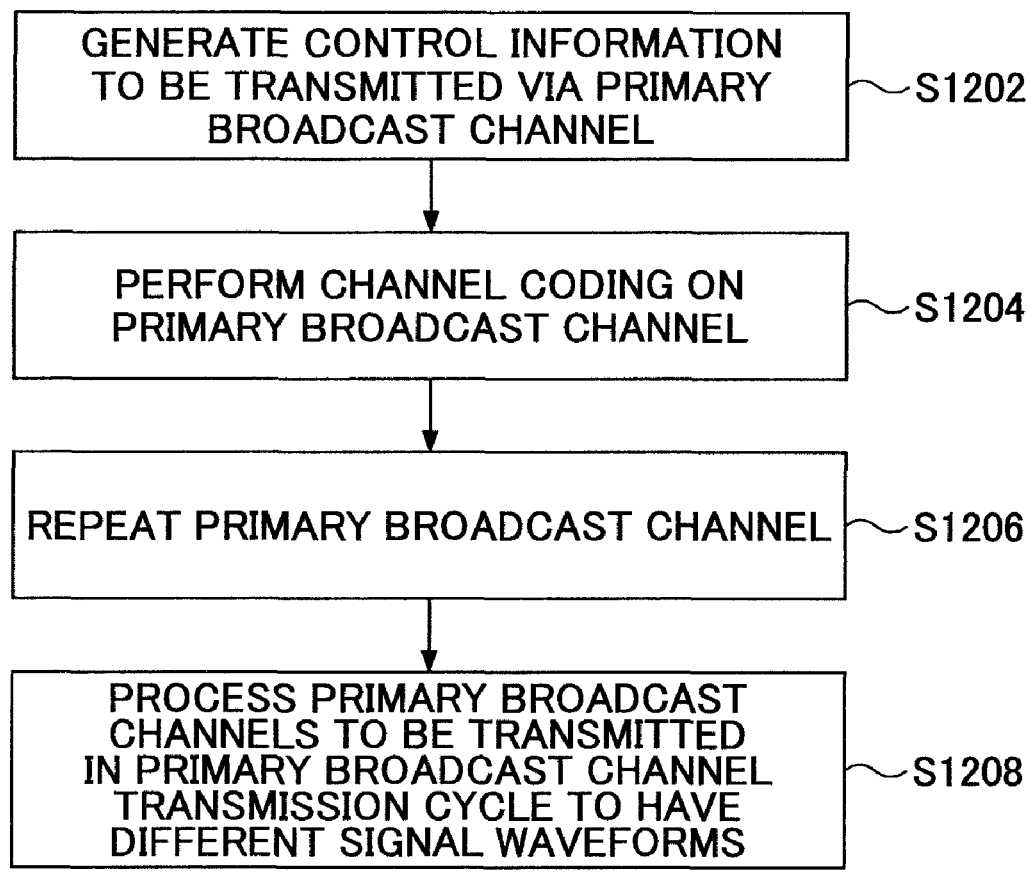
FIG. 12 is a flowchart showing a process of transmitting a primary control channel according to an embodiment of the present invention.

Next, a broadcast channel transmission method of this embodiment is described with reference to FIG. 12.

The BCH control information generating unit 202 generates control information to be transmitted via a primary broadcast channel (step S1202).

The channel coding unit 204 performs channel coding on the control information, i.e., the primary broadcast channel, generated by the BCH control information generating unit 202 (step S1204).

The repetition unit 206 repeats (or duplicates) the channel-coded primary broadcast channel for the number of times the primary broadcast channel is transmitted in a primary broadcast channel transmission cycle to generate multiple primary broadcast channels (step S1206).

Then, the primary broadcast channels to be transmitted in the primary broadcast channel transmission cycle are processed to have different waveforms (step S1208). For example, a process as described above is performed by the P-BCH transmission method control unit 220.

Figure 13:
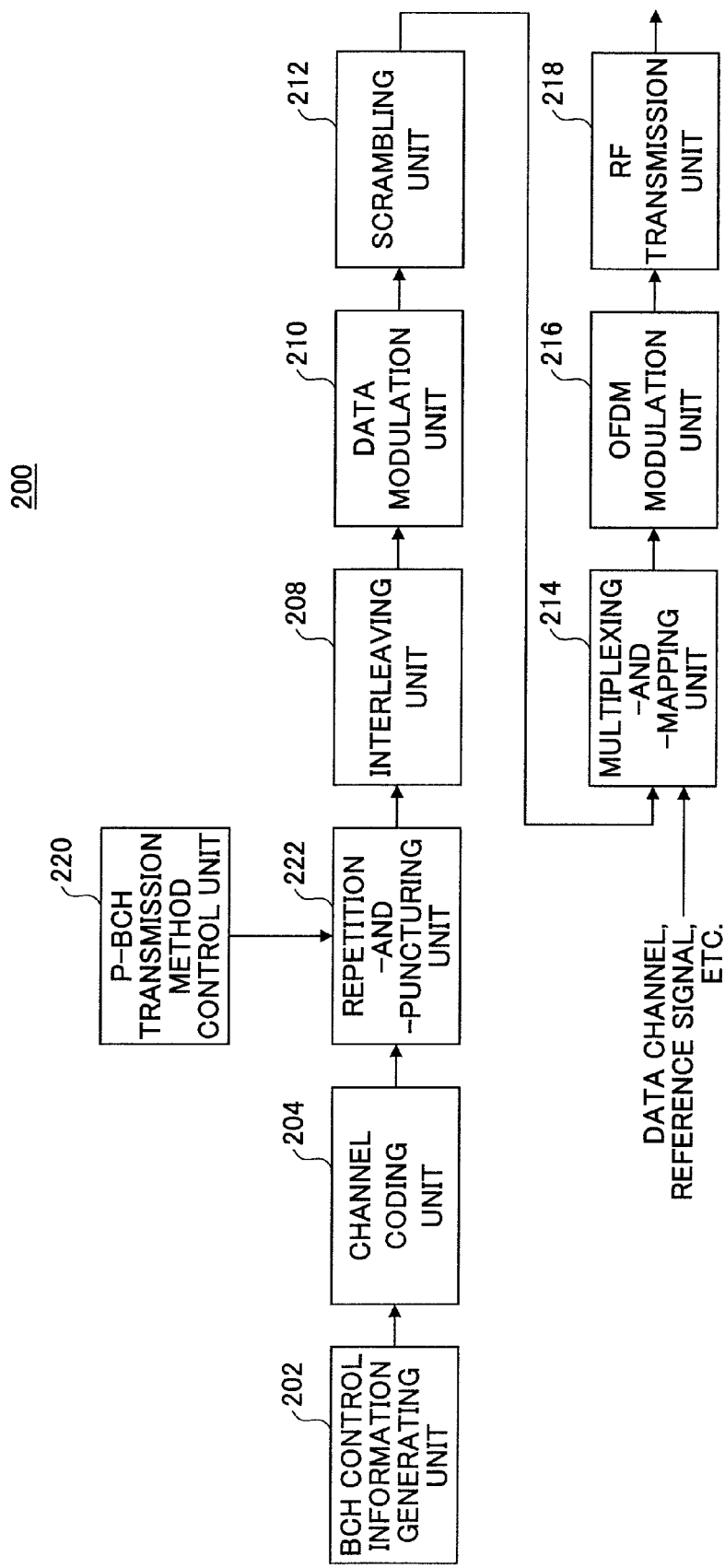
FIG. 13 is a partial block diagram of a base station according to an embodiment of the present invention.

Next, the base station 200 according to a second embodiment of the present invention is described with reference to FIG. 13.

The base station 200 of this embodiment has a configuration similar to that described with reference to FIG. 8 except that a repetition-and-puncturing unit 222 is provided instead of the repetition unit 206 and the P-BCH transmission method control unit 220 is connected to the repetition-and-puncturing unit 222.

The P-BCH transmission method control unit 220 assigns different puncturing patterns, which are used to puncture redundancy bits attached to the information bits of the primary broadcast channel, to the respective bursts of the primary broadcast channel to be transmitted in the primary broadcast channel transmission cycle. For example, assuming that the primary broadcast channel is to be transmitted four times in a primary broadcast channel transmission cycle, the P-BCH transmission method control unit 220 prepares four different puncturing patterns. In this case, the puncturing patterns are associated in advance with positions of primary broadcast channels (bursts) in the order of transmission.

The repetition-and-puncturing unit 222 repeats (or duplicates) the primary broadcast channel for the number of times the primary broadcast channel is to be transmitted in a primary broadcast channel transmission cycle to generate multiple, e.g., four, primary broadcast channels (bursts), and punctures redundancy bits attached to the information bits of the respective primary broadcast channels based on the puncturing patterns input from the P-BCH transmission method control unit 220.

As a result, multiple, e.g., four, primary broadcast channels punctured by different puncturing patterns are transmitted (i.e., the primary broadcast channel is transmitted four times) in a primary broadcast channel transmission cycle. Thus, it is possible to vary signal waveforms of primary broadcast channels to be transmitted in a primary broadcast channel transmission cycle by puncturing the primary broadcast channels with different puncturing patterns.

The user device 100 demodulates the primary broadcast channel by blind detection where all predefined puncturing patterns are tried to decode the primary broadcast channel. Since multiple primary broadcast channels (bursts) are transmitted in a primary broadcast channel transmission cycle by the "all bits in each burst" method, the user device 100 can obtain primary broadcast channel information by receiving just one primary broadcast channel, i.e., without receiving other primary broadcast channels. This method makes it possible to reduce the time necessary to receive the primary broadcast channel. Also, this method makes it possible to detect the position of a primary broadcast channel in the order of transmission by receiving only that one primary broadcast channel and thereby to detect the boundary between primary broadcast channel transmission cycles.

Further, varying signal waveforms by using different puncturing patterns makes it possible to achieve channel coding gain.

Figure 14:
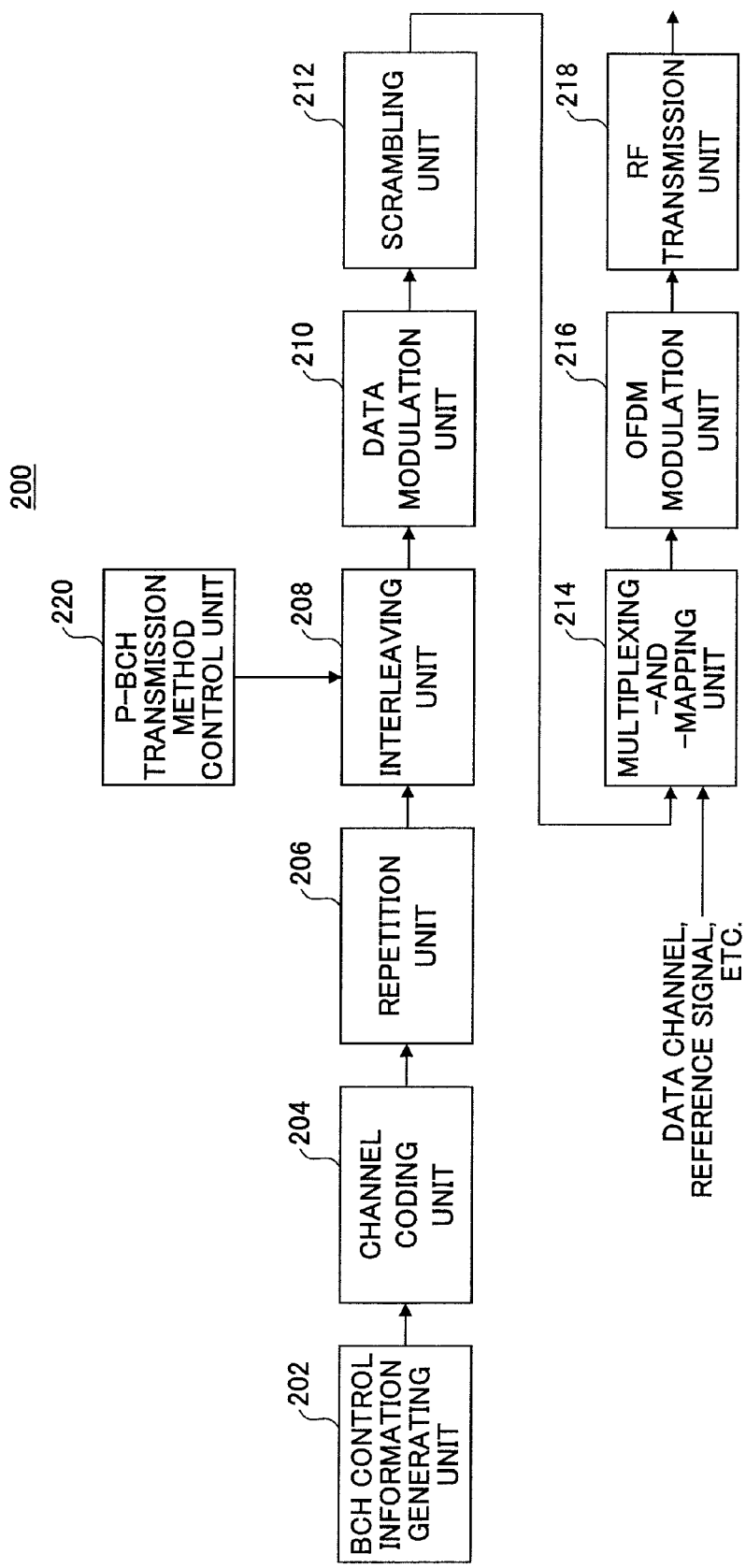
FIG. 14 is a partial block diagram of a base station according to an embodiment of the present invention.

Next, the base station 200 according to a third embodiment of the present invention is described with reference to FIG. 14.

The base station 200 of this embodiment has a configuration similar to that described with reference to FIG. 8 except that the P-BCH transmission control unit 220 is connected to the interleaving unit 208.

The P-BCH transmission method control unit 220 assigns different interleaving patterns, which are used by the interleaving unit 208 to interleave (or reorder) the information bits and the redundancy bits, to the respective bursts of the primary broadcast channel. Here, the interleaving patterns indicate patterns or rules for interleaving the bits. For example, assuming that the primary broadcast channel is to be transmitted four times in a primary broadcast channel transmission cycle, the P-BCH transmission method control unit 220 prepares four different interleaving patterns.

In this case, the interleaving patterns are associated in advance with positions of the primary broadcast channels (bursts) in the order of transmission.

The interleaving unit 208 performs an interleaving process to interleave (or reorder) bits constituting the respective primary broadcast channels based on the interleaving patterns input from the P-BCH transmission method control unit 220, and inputs the processed primary broadcast channels to the data modulation unit 210.

As a result, multiple, e.g., four, primary broadcast channels on which the interleaving process is performed based on different interleaving patterns are transmitted (i.e., the primary broadcast channel is transmitted four times) in a primary broadcast channel transmission cycle. Thus, it is possible to vary signal waveforms of primary broadcast channels to be transmitted in a primary broadcast channel transmission cycle by interleaving bits of the respective primary broadcast channels with different interleaving patterns.

The user device 100 demodulates the primary broadcast channel by blind detection where all predefined interleaving patterns are tried to decode the primary broadcast channel. Since multiple primary broadcast channels (bursts) are transmitted in a primary broadcast channel transmission cycle by the "all bits in each burst" method, the user device 100 can obtain primary broadcast channel information by receiving just one primary broadcast channel, i.e., without receiving other primary broadcast channels. This method makes it possible to reduce the time necessary to receive the primary broadcast channel. Also, this method makes it possible to detect the position of a primary broadcast channel in the order of transmission by receiving only that one primary broadcast channel and thereby to detect the boundary between primary broadcast channel transmission cycles.

Further, varying signal waveforms by using different interleaving patterns makes it possible to achieve frequency diversity gain.

Figure 15:
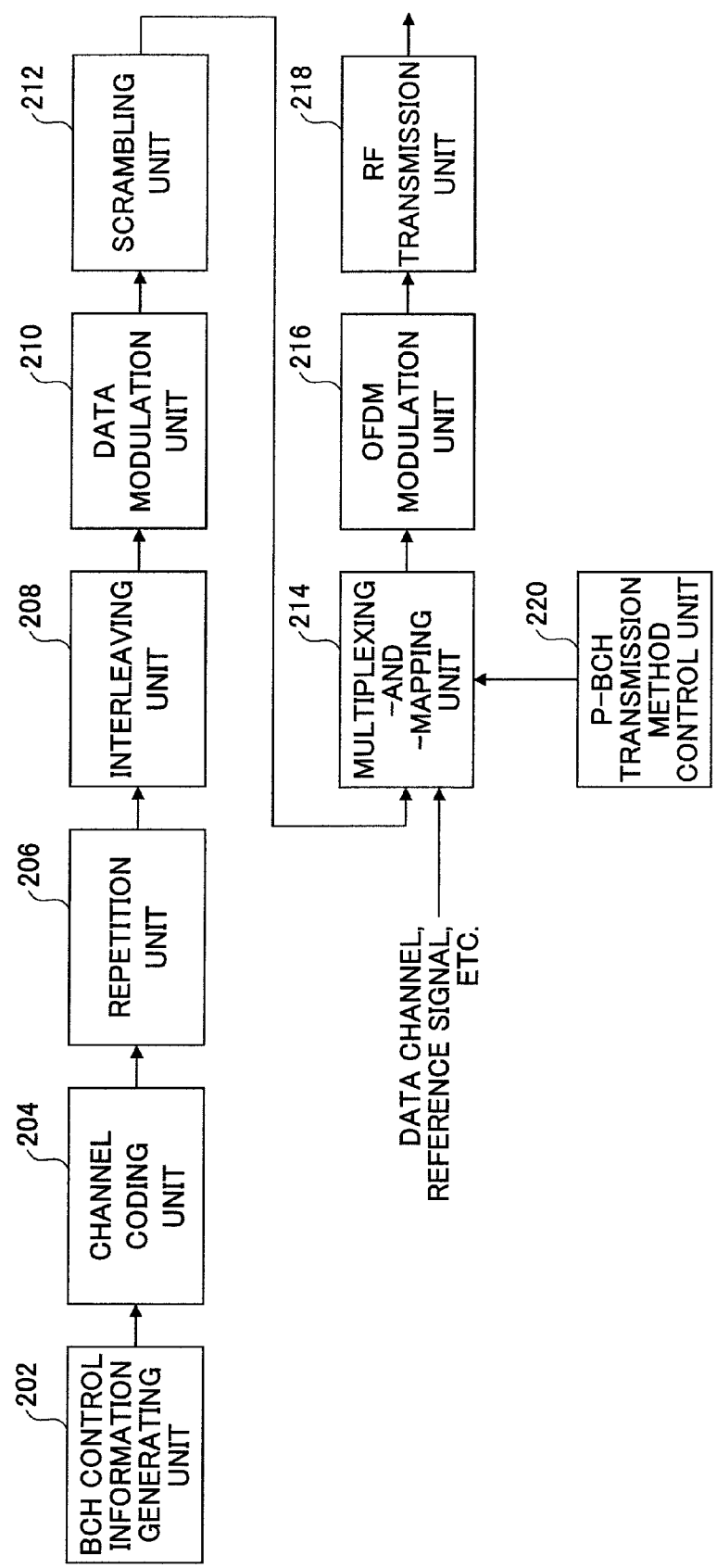
FIG. 15 is a partial block diagram of a base station according to an embodiment of the present invention.

Next, the base station 200 according to a fourth embodiment of the present invention is described with reference to FIG. 15.

The base station 200 of this embodiment has a configuration similar to that described with reference to FIG. 8 except that the P-BCH transmission control unit 220 is connected to the multiplexing-and-mapping unit 214.

The P-BCH transmission method control unit 220 controls the multiplexing-and-mapping unit 214 to map respective bursts of the primary broadcast channel to different radio resources. For example, assuming that the primary broadcast channel is to be transmitted four times in a primary broadcast channel transmission cycle, the P-BCH transmission method control unit 220 prepares four different radio resources. In this case, the radio resources are associated in advance with positions of the primary broadcast channels (bursts) in the order of transmission.

The multiplexing-and-mapping unit 214 multiplexes the spread primary broadcast channels input from the scrambling unit 212, the data channel, and the reference signal based on radio resource information input from the P-BCH transmission method control unit 220.

As a result, multiple, e.g., four, primary broadcast channels are transmitted (i.e., the primary broadcast channel is transmitted four times) using different radio resources in a primary broadcast channel transmission cycle.

Thus, it is possible to vary signal waveforms of primary broadcast channels to be transmitted in a primary broadcast channel transmission cycle by allocating different radio resources to the primary broadcast channels.

The user device 100 demodulates the primary broadcast channel by blind detection where all predefined radio resources are tried to decode the primary broadcast channel. Since multiple primary broadcast channels (bursts) are transmitted in a primary broadcast channel transmission cycle by the "all bits in each burst" method, the user device 100 can obtain primary broadcast channel information by receiving just one primary broadcast channel, i.e., without receiving other primary broadcast channels. This method makes it possible to reduce the time necessary to receive the primary broadcast channel. Also, this method makes it possible to detect the position of a primary broadcast channel in the order of transmission by receiving only that one primary broadcast channel and thereby to detect the boundary between primary broadcast channel transmission cycles.

Further, for example, allocating different frequency bands or resource blocks to the respective bursts of the primary broadcast channel makes it possible to achieve frequency diversity gain.

Next, the base station 200 according to a fifth embodiment of the present invention is described.

In 3GPP Evolved UTRA and UTRAN, a system bandwidth is between 1.25 MHz and 20 MHz. In this embodiment, the base station 200 transmits the broadcast channel using, for example, a 1.08 MHz frequency band including the center frequency. Also, the broadcast channel is preferably transmitted in the same center frequency band as that used for transmission of the synchronization channel. This configuration enables the mobile station to receive the broadcast channel without changing the center frequency after a cell search and thereby to reduce time necessary to receive minimum system information. The center frequency of the broadcast channel is preferably the center of the system bandwidth. This makes it possible to simplify the reception processing at the mobile station.

The base station 200 of this embodiment has a configuration as described above and employs precoding vector switching (PVS) to achieve transmission diversity. In PVS, each primary broadcast channel in a primary broadcast channel transmission cycle is multiplied by different weights for transmission from multiple antennas, e.g., antenna #1 and antenna #2. In this case, the synchronization channel and the primary broadcast channel are transmitted using the same precoding vector. This method enables the user device 100 to perform channel estimation using the synchronization channel as a reference. The user device 100 demodulates the primary broadcast channel on an assumption that the primary broadcast channel is transmitted using the same precoding vector as that used for the synchronization channel. Therefore, it is not necessary to report to the user device 100 whether transmission diversity is employed. For example, it is not necessary to report a transmission diversity mode such as the number of antennas via the secondary synchronization channel. This also applies to a case where only one antenna is used for transmission.

Thus, this method enables the user device 100 to use soft combining to receive the primary broadcast channel and thereby to achieve diversity gain. Soft combining is applied to adjacent cells.

Figure 16:
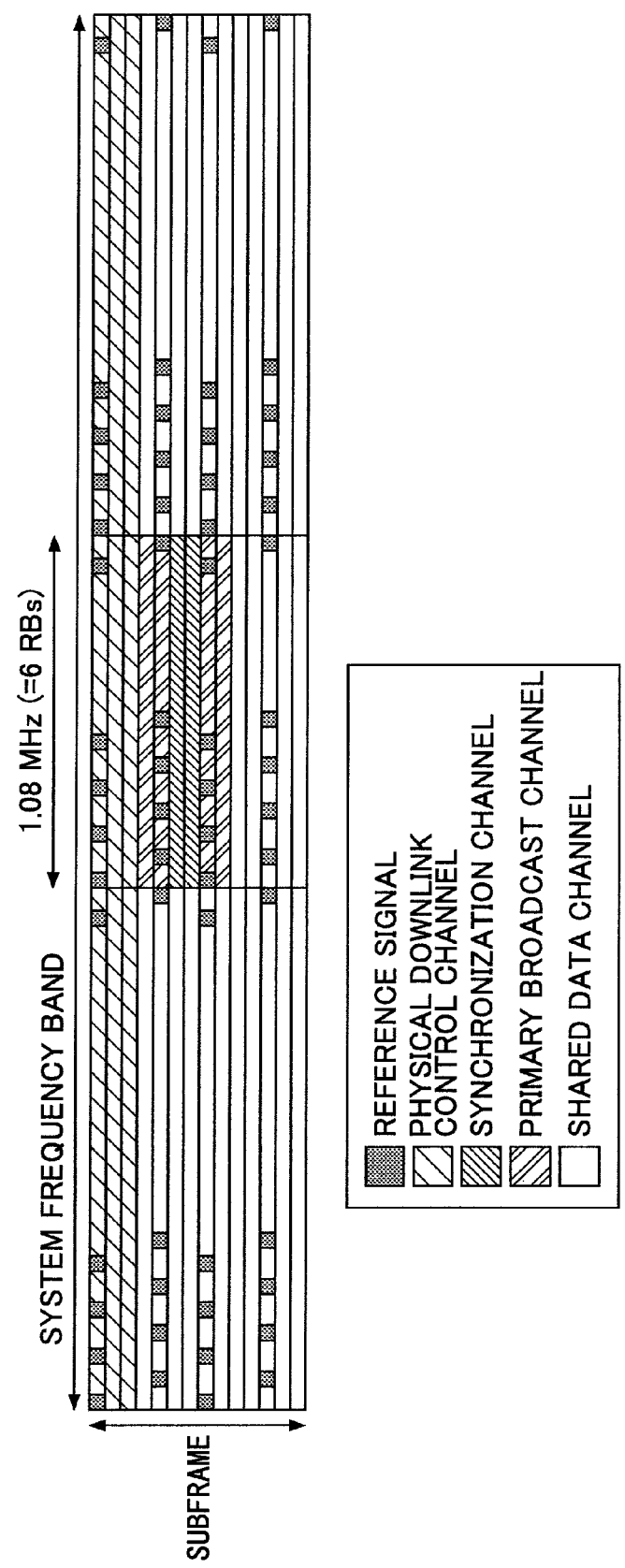
FIG. 16 is a drawing illustrating a method of mapping a primary broadcast channel according to an embodiment of the present invention.

As shown in FIG. 16, the multiplexing-and-mapping unit 214 maps the primary broadcast channel across the same center frequency band as that where the synchronization channel is mapped. The multiplexing-and-mapping unit 214 may be configured to map respective primary broadcast channels to be transmitted in a primary broadcast channel transmission cycle to different OFDM symbols. Also, to improve the accuracy of channel estimation based on the synchronization channel, it is preferable to map the primary broadcast channel to OFDM symbols adjacent to those to which the synchronization channel is mapped.

Mapping the primary broadcast channel across the same center frequency band as that where the synchronization channel is mapped makes it possible to achieve frequency diversity gain. Also, mapping the primary broadcast channel to a part of OFDM symbols in a subframe enables the user device 100 to receive the primary broadcast channel within a short period of time. This in turn makes it possible to save battery energy. Being able to complete reception of the primary broadcast channel within a short period of time is particularly preferable when the user device 100 is in the intermittent reception (DRX) mode. Also, since only a part of OFDM symbols are used, it is easy to switch the short CP to the long CP and vice versa.

Next, the base station 200 according to a sixth embodiment of the present invention is described.

In 3GPP Evolved UTRA and UTRAN, a system bandwidth is between 1.25 MHz and 20 MHz. In this embodiment, the base station 200 transmits the broadcast channel using, for example, a part of a 1.08 MHz frequency band including the center frequency. Also, the broadcast channel is preferably transmitted in the same center frequency band as that used for transmission of the synchronization channel. This configuration enables the mobile station to receive the broadcast channel without changing the center frequency after a cell search and thereby to reduce time necessary to receive minimum system information. The center frequency of the broadcast channel is preferably the center of the system bandwidth. This makes it possible to simplify the reception processing at the mobile station.

The base station 200 of this embodiment has a configuration as described above and employs space frequency block coding (SFBC) to achieve transmission diversity. In this case, a reference signal is used for channel estimation when receiving the primary broadcast channel.

Figure 17:
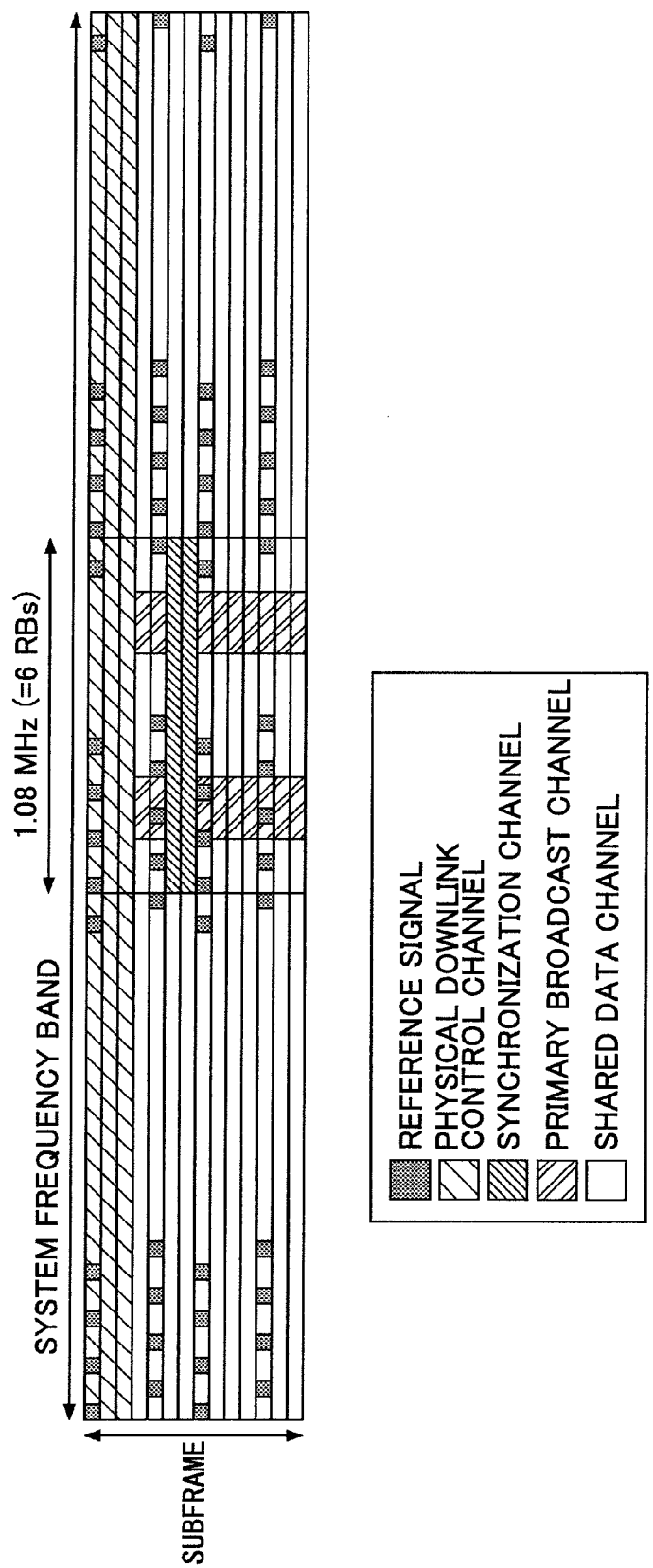
FIG. 17 is a drawing illustrating a method of mapping a primary broadcast channel according to an embodiment of the present invention.

As shown in FIG. 17, the multiplexing-and-mapping unit 214 maps the primary broadcast channel in the same center frequency band as that where the synchronization channel is mapped. The primary broadcast channel and the shared data channel are frequency-division-multiplexed such that each of the channels is mapped to multiple frequency components arranged at certain intervals. Such a multiplexing scheme is called distributed frequency division multiplexing (FDM). Distributed FDM is preferable to achieve frequency diversity gain. In the example shown in FIG. 17, a frequency band that is an integral multiple of a resource block is allocated to the primary broadcast channel. In other words, the primary broadcast channel and the shared data channel are multiplexed based on resource blocks. This method makes it possible to reduce the transmission power to be allocated to the shared data channel and to allocate extra transmission power obtained by the reduction to the primary broadcast channel. That is, this method enables power boosting.

Next, the base station 200 according to a seventh embodiment of the present invention is described.

As described with reference to FIG. 16, the base station 200 of this embodiment maps the primary broadcast channel across the same center frequency band as that where the synchronization channel is mapped, for example, across a 1.08 MHz frequency band including the center frequency. For example, the primary broadcast channel is mapped to OFDM symbols adjacent to those used for the synchronization channel.

Figure 18:
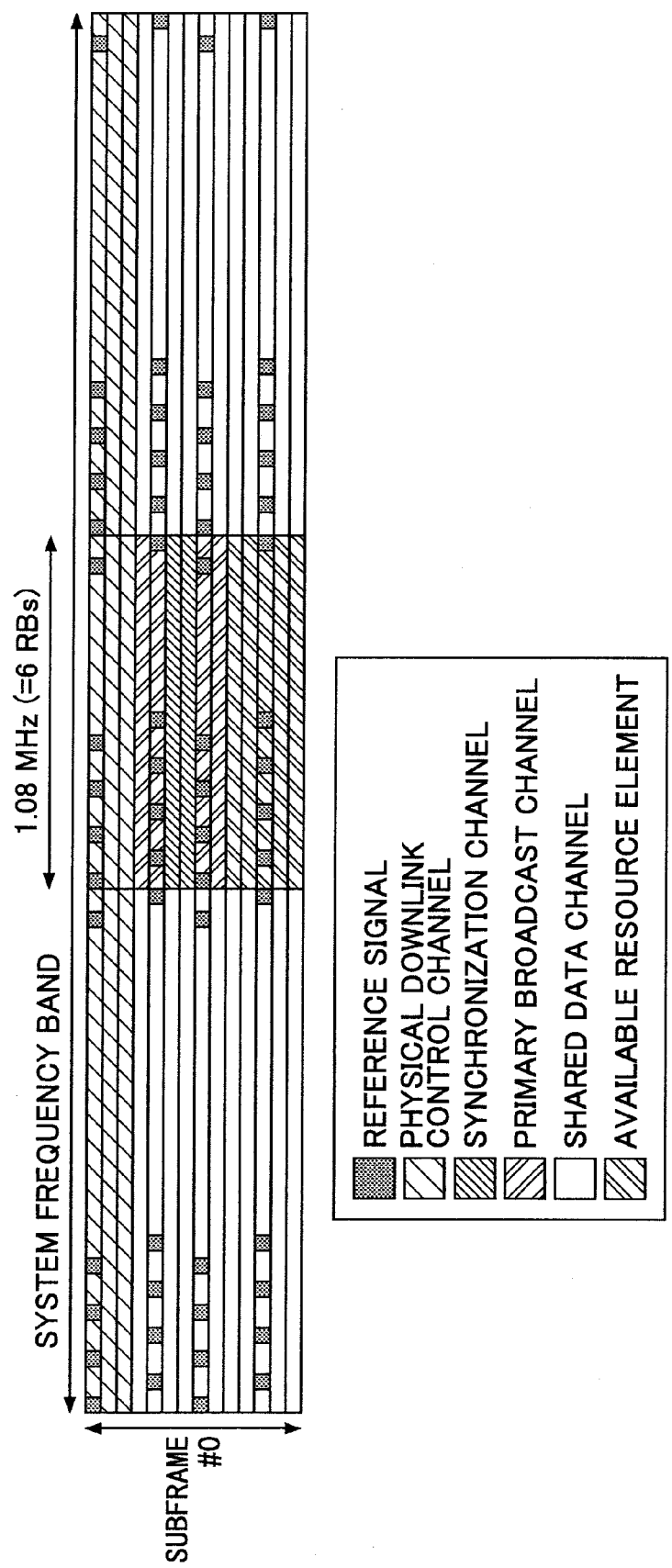
FIG. 18 is a drawing illustrating exemplary subframe mapping according to an embodiment of the present invention.

In the example shown in FIG. 18 where the data amount of the primary broadcast channel is about four symbols, resource elements (REs) corresponding to symbols 10-14 in subframe #0 in the center frequency band are left unused and available for other channels. Here, a resource element indicates a radio resource composed of one OFDM symbol and one subcarrier. Thus, resource elements in the center frequency band other than those allocated to the physical downlink control channel, the reference signal, the synchronization channel, and the primary broadcast channel are available for other channels.

Figure 19:
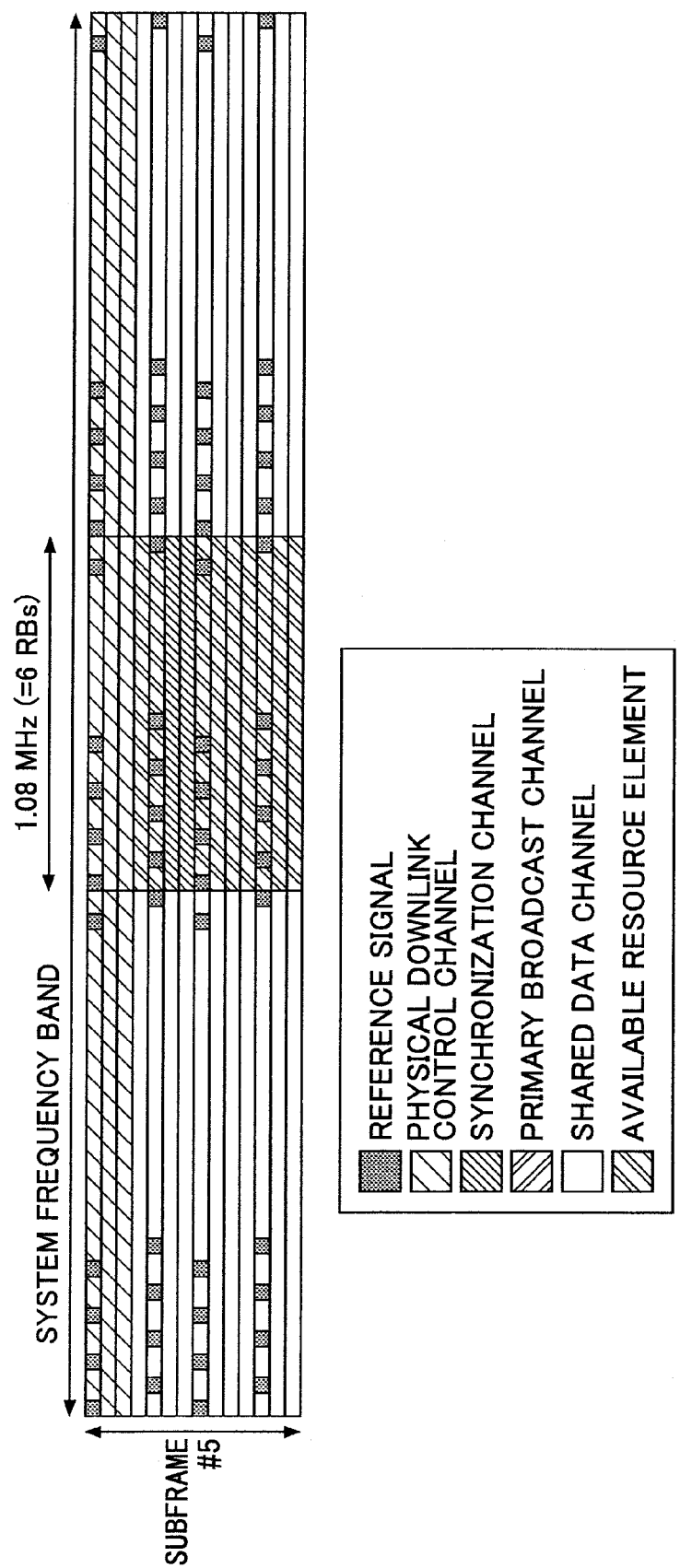
FIG. 19 is a drawing illustrating exemplary subframe mapping according to an embodiment of the present invention.

Similarly, in the example shown in FIG. 19, resource elements corresponding to symbols 4-5 and 8-14 in subframe #5 in the center frequency band are left unused and available for other channels. In other words, resource elements in the center frequency band other than those allocated to the physical downlink control channel, the reference signal, and the synchronization channel are available for other channels.

Figure 20:
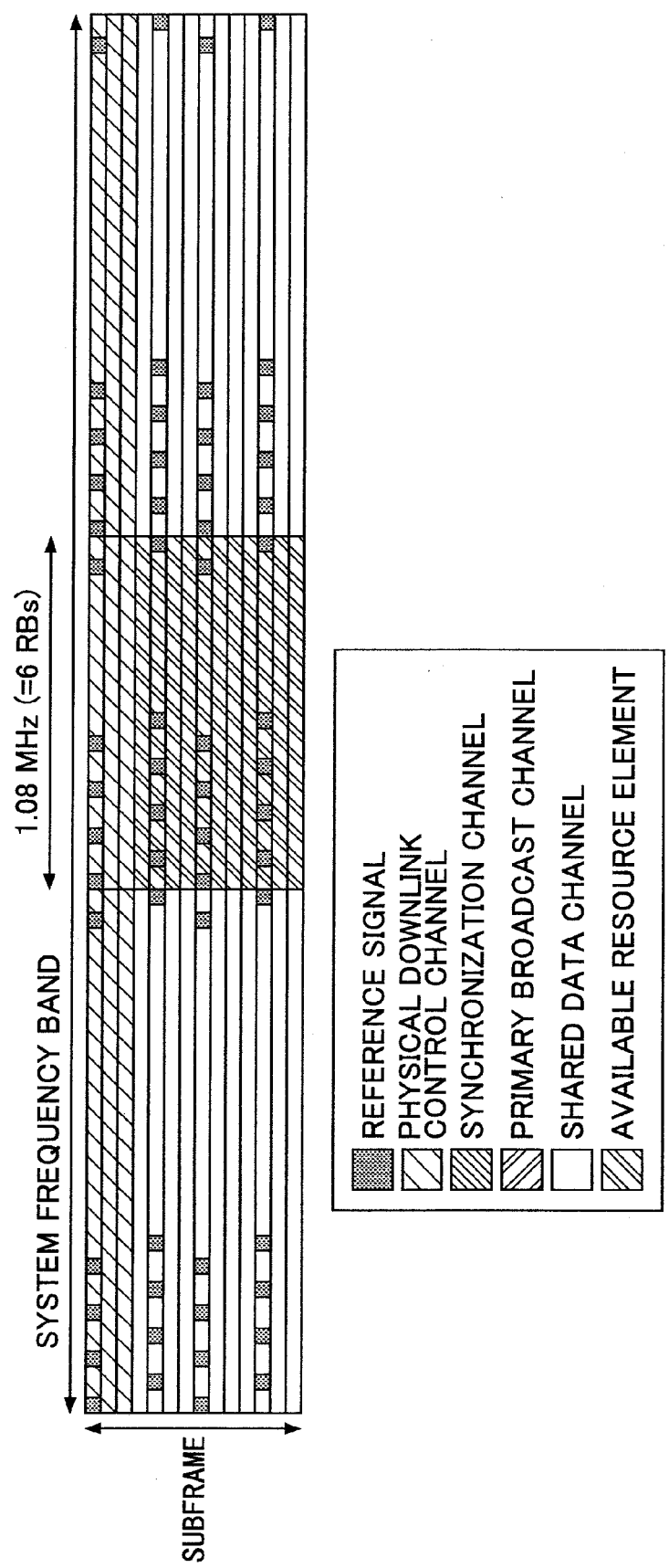
FIG. 20 is a drawing illustrating exemplary subframe mapping according to an embodiment of the present invention.

Also, in the example shown in FIG. 20, resource elements corresponding to symbols 4-14 in subframes other than subframes #0 and #5 in the center frequency band are left unused and available for other channels. In other words, resource elements in the center frequency band other than those allocated to the physical downlink control channel and the reference signal are available for other channels.

In subframes other than subframes #0 and #5 described above, the number of resource elements other than those allocated to the physical downlink control channel and the reference signal in each resource block (hereafter called a resource block size) in the center frequency band is the same as that number (or the resource block size) in other frequency bands in the system frequency band. Therefore, scheduling can be performed without any problem.

Meanwhile, in subframes #0 and #5 described above, the number of available symbols or resource elements in each resource block (or the resource block size) in the center frequency band is different from that number (or the resource block size) in other frequency bands in the system frequency band. Therefore, it is necessary to perform scheduling taking into account resource block sizes.

The center frequency band has a size of six resource blocks in the frequency direction. The base station 200 of this embodiment maps a broadcast channel to be transmitted via the physical downlink shared channel, i.e., the dynamic broadcast channel, to the available (remaining) resource elements. Also, the base station 200 of this embodiment may be configured to allocate some of the available resource elements preferentially to the broadcast channel to be transmitted via the physical downlink shared channel and to allocate still remaining resource elements to a data channel.

Figure 21:
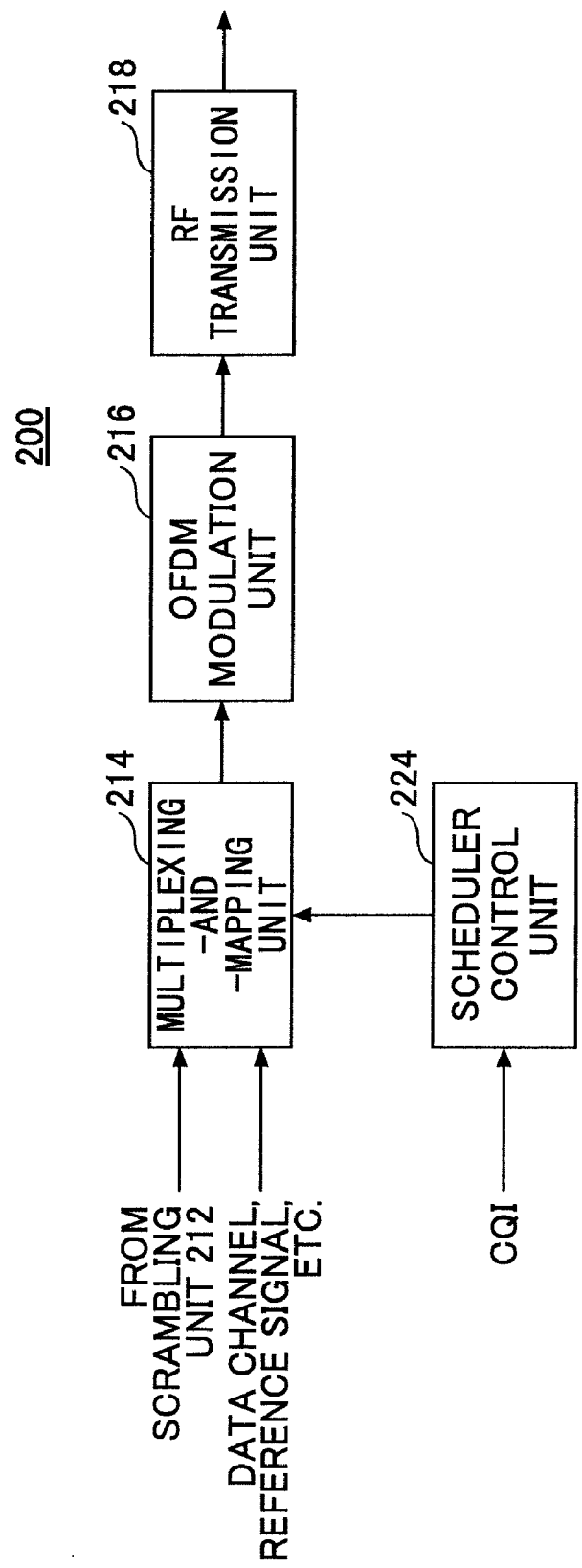
FIG. 21 is a partial block diagram of a base station according to an embodiment of the present invention.

The base station 200 of this embodiment is described below with reference to FIG. 21.

The base station 200 of this embodiment has a configuration similar to that described with reference to any one of FIGS. 8, 13, 14, and 15, and further includes a scheduler (control unit) 224 connected to the multiplexing-and-mapping unit 214.

Figure 22:
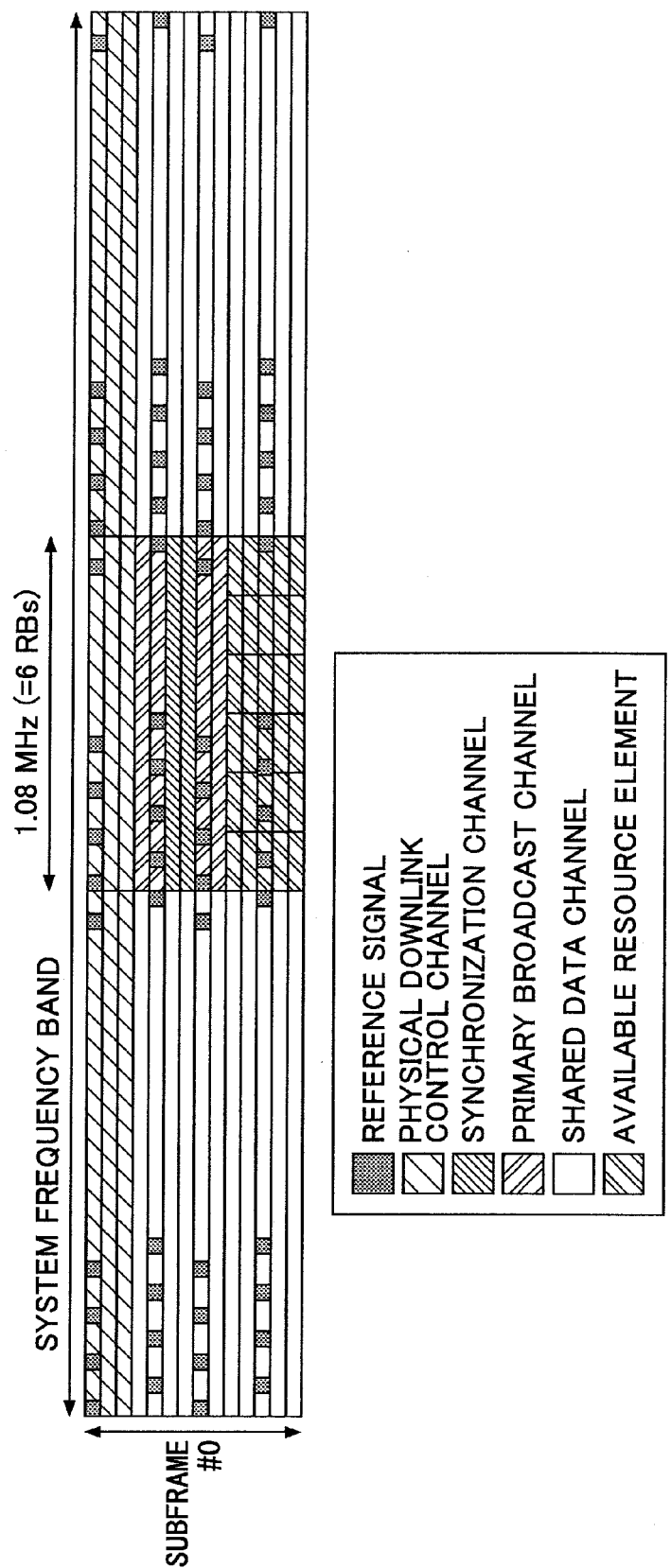
FIG. 22 is a drawing illustrating exemplary subframe mapping according to an embodiment of the present invention.

As shown in FIG. 22, the scheduler 224 performs scheduling for the center frequency band based on (or in units of) resource blocks in a manner similar to the scheduling for other frequency bands in the system frequency band. In this embodiment, as described above, the size of resource blocks or the number of available resource elements in each resource block in the center frequency band is different from that in other frequency bands in the system frequency band. Therefore, the scheduler 224 allocates resource blocks in the center frequency band to the broadcast channel to be transmitted via the physical downlink shared channel based on the size of the resource blocks. FIG. 22 shows an example of mapping in subframe #0. However, scheduling for subframe #5 is also performed in a similar manner based on resource blocks.

Here, scheduling indicates a process of selecting mobile stations allowed to communicate using a shared channel for each subframe (1 ms). For example, scheduling is performed based on CQIs reported via uplink by mobile stations. Also in the scheduling, resource blocks used for user data to be received by the selected mobile stations are determined.

Thus, in this embodiment, scheduling for the center frequency band is also performed based on resource blocks in a manner similar to the scheduling for other frequency bands in the system frequency band. With this method, since scheduling for the center frequency band and scheduling for other frequency bands are performed based on the same physical layer units, i.e., resource blocks, it is possible to unify formats of control signals for resource allocation.

Next, a process performed by the scheduler 224 of the base station 200 of this embodiment is described with reference to FIG. 23.

The scheduler 224 sets a subframe number t at 0 (step S2302).

Next, the scheduler 224 calculates weights of 0 resource blocks (RBs) for respective users (step S2304). For example, weights are calculated based on CQIs reported for respective RBs via uplink by each mobile station. Also, the traffic wait time, data sizes, and traffic types of users and radio resource sizes of RBs may also be taken into account in calculating weights of RBs for the users. The traffic wait time includes delay time and the traffic type includes acceptable delay and an acceptable packet error rate. More particularly, in subframes #0 and #5, weights of RBs are calculated for respective users based on resource block sizes.

The scheduler 224 allocates radio resources of the RBs based on the calculated weights (step S2306). Then, transmission processing is performed (step S2308).

The scheduler 224 sets the subframe number t at t+1 (step S2310) and returns to step S2304 to perform scheduling for the next subframe.

In this embodiment, scheduling is performed based on an assumption that there are resource blocks with different radio resource sizes. In other words, scheduling is performed based on resource block sizes.

Next, the base station 200 according to an eighth embodiment of the present invention is described.

As described with reference to FIG. 16, the base station 200 of this embodiment maps the primary broadcast channel across the same center frequency band as that where the synchronization channel is mapped. For example, the primary broadcast channel is mapped to OFDM symbols adjacent to those used for the synchronization channel.

In the example shown in FIG. 18 where the data amount of the primary broadcast channel is about four symbols, resource elements corresponding to symbols 10-14 in subframe #0 in the center frequency band are left unused and available for other channels. In other words, resource elements in the center frequency band other than those allocated to the physical downlink control channel, the reference signal, the synchronization channel, and the primary broadcast channel are available for other channels.

Similarly, in the example shown in FIG. 19, resource elements corresponding to symbols 4-5 and 8-14 in subframe #5 in the center frequency band are left unused and available for other channels. In other words, resource elements in the center frequency band other than those allocated to the physical downlink control channel, the reference signal, and the synchronization channel are available for other channels.

Also, in the example shown in FIG. 20, resource elements corresponding to symbols 4-14 in subframes other than subframes #0 and #5 in the center frequency band are left unused and available for other channels. In other words, resource elements in the center frequency band other than those allocated to the physical downlink control channel and the reference signal are available for other channels.

In subframes other than subframes #0 and #5 described above, the number of resource elements other than those allocated to the physical downlink control channel and the reference signal in each resource block (or the resource block size) in the center frequency band is the same as that number (or the resource block size) in other frequency bands in the system frequency band. Therefore, scheduling can be performed without any problem.

Meanwhile, in subframes #0 and #5 described above, the number of resource elements other than those allocated to the physical downlink control channel and the reference signal in each resource block (or the resource block size) in the center frequency band is different from that number (or the resource block size) in other frequency bands in the system frequency band. Therefore, it is necessary to perform scheduling taking into account resource block sizes.

The center frequency band has a size of six resource blocks in the frequency direction. The base station 200 of this embodiment maps a broadcast channel to be transmitted via the physical downlink shared channel, i.e., the dynamic broadcast channel, to the available (remaining) resource elements. Also, the base station 200 of this embodiment may be configured to allocate some of the available resource elements preferentially to the broadcast channel to be transmitted via the physical downlink shared channel and to allocate still remaining resource elements to a data channel.

The configuration of the base station 200 of this embodiment is substantially the same as that described with reference to FIG. 21.

As shown in FIG. 24, the scheduler 224 groups resource elements in the center frequency band other than those allocated to the physical downlink control channel, the reference signal, the synchronization channel, and the primary broadcast channel such that the number of resource elements in each group becomes the same as the number of resource elements in each resource block in other frequency bands in the system frequency band. For example, each resource block in the other frequency bands in the system frequency band is composed of 11 symbols and 12 subcarriers (=180 kHz) and therefore includes 11×12=132 resource elements. Meanwhile, in the center frequency band, only five symbols are available. Therefore, to form a resource block having the same size as that in the other frequency bands, 132/5=26.5 subcarriers are necessary. In this example, the center frequency band is divided into two to form two resource blocks. In actual cases, the number of resource elements in each resource block in the center frequency band becomes greater than the number of resource elements in each resource block in frequency bands other than the center frequency band. The surplus resource elements may be used, for example, for repetition to increase data redundancy, or may be reserved for future use as shown in FIG. 25. Using the surplus resource elements for repetition makes it possible to improve communication quality.

The scheduler 224 performs scheduling based on (or in units of) resource blocks. In this embodiment, as described above, the size of resource blocks or the number of resource elements in each resource block in the center frequency band is substantially the same as that in other frequency bands in the system frequency band. This makes it possible to use substantially the same channel coding rate and to achieve substantially the same communication quality for resource blocks in the center frequency band and other frequency bands.

Here, scheduling indicates a process of selecting mobile stations allowed to communicate using a shared channel for each subframe (1 ms). For example, scheduling is performed based on CQIs reported via uplink by mobile stations. In a case where each mobile station reports CQIs of respective resource blocks, a CQI of a resource block in the center frequency band is represented by an average of CQIs of frequency bands corresponding to the resource block. Also in the scheduling, resource blocks used for user data to be received by the selected mobile stations are determined.

Thus, making the number of resource elements in each resource block in the center frequency band the same as the number of resource elements in each resource block in other frequency bands in the system frequency band makes it possible to simplify the scheduling process at the base station 200.

In the above embodiments, it is assumed that a system based on Evolved UTRA and UTRAN (also called Long Term Evolution or Super 3G) is used. However, a base station and a broadcast channel transmission method according to the present invention may also be applied to any system employing orthogonal frequency division multiplexing (OFDM) for downlink.

Although the present invention is described above in different embodiments, the distinctions between the embodiments are not essential for the present invention, and the embodiments may be implemented individually or in combination. Although specific values are used in the above descriptions to facilitate the understanding of the present invention, the values are just examples and different values may also be used unless otherwise mentioned.

The present invention is not limited to the specifically disclosed embodiments, and variations and modifications may be made without departing from the scope of the present invention. Although functional block diagrams are used to describe apparatuses in the above embodiments, the apparatuses may be implemented by hardware, software, or a combination of them.

The present international application claims priority from Japanese Patent Application No. 2007-161947 filed on Jun. 19, 2007 and Japanese Patent Application No. 2007-211599 filed on Aug. 14, 2007, the entire contents of which are hereby incorporated herein by reference.

The invention claimed is:

1. A base station transmitting a broadcast channel to a user device a predefined number of times in a predetermined cycle for communication with the user device, the base station comprising:
   a repetition unit configured to repeat the broadcast channel, after the broadcast channel is channel-coded, for the predefined number of times to generate multiple broadcast channels;
   a signal waveform changing unit configured to process the generated broadcast channels such that the processed broadcast channels have different signal waveforms, wherein positions of the broadcast channels in order of transmission in the predetermined cycle are associated with the signal waveforms of the broadcast channels;
   an interleaving unit configured to interleave information bits of the respective broadcast channels generated by the repetition unit;
   a data modulation unit configured to data-modulate the interleaved broadcast channels; and
   a spreading unit configured to multiply the data-modulated broadcast channels by scrambling codes,
   wherein the signal waveform changing unit is configured to control the spreading unit to multiply the respective data-modulated broadcast channels by different scrambling codes.

2. The base station as claimed in claim 1, wherein the signal waveform changing unit is configured to puncture the broadcast channels generated by the repetition unit using different puncturing patterns.

3. The base station as claimed in claim 1, further comprising:
   an interleaving unit configured to interleave information bits of the respective broadcast channels generated by the repetition unit,
   wherein the signal waveform changing unit is configured to control the interleaving unit to interleave the information bits of the respective broadcast channels based on different interleaving patterns.

4. The base station as claimed in claim 1, further comprising:
   an interleaving unit configured to interleave information bits of the respective broadcast channels generated by the repetition unit;
   a data modulation unit configured to data-modulate the interleaved broadcast channels;
   a spreading unit configured to multiply the data-modulated broadcast channels by scrambling codes; and
   a mapping unit configured to map the multiplied broadcast channels in a center frequency band in a system frequency band, wherein the signal waveform changing unit is configured to control the mapping unit to map the respective multiplied broadcast channels to different radio resources.

5. The base station as claimed in claim 4, wherein the mapping unit is configured to map the broadcast channels across the same center frequency band as that where a synchronization channel is mapped.

6. The base station as claimed in claim 5, further comprising:
a scheduler configured to select, for each subframe, one or more mobile stations allowed to communicate using a shared channel and to determine resource blocks used for user data to be received by the selected mobile stations,
wherein the mapping unit is configured to map a broadcast channel including information on the determined resource blocks and to be transmitted via a physical downlink shared channel to one or more resource blocks in the same center frequency band as that where the synchronization channel is mapped.

7. The base station as claimed in claim 6, wherein a bandwidth of the resource blocks in the center frequency band is the same as a bandwidth of resource blocks in frequency bands other than the center frequency band.

8. The base station as claimed in claim 7, wherein a size of the resource blocks in the center frequency band is the same as a size of the resource blocks in the frequency bands other than the center frequency band.

9. The base station as claimed in claim 4, wherein the mapping unit is configured to map the broadcast channels in a part of the same center frequency band as that where a synchronization channel is mapped.

10. A method of transmitting a broadcast channel by a base station to a user device for communication with the user device where the broadcast channel is transmitted a predefined number of times in a predetermined cycle, the method comprising:
a repetition step of repeating the broadcast channel, after the broadcast channel is channel-coded, for the predefined number of times to generate multiple broadcast channels;
a signal waveform changing step of processing the generated broadcast channels such that the processed broadcast channels have different signal waveforms that are associated with positions of the broadcast channels in order of transmission in the predetermined cycle;
an interleaving step of interleaving information bits of the respective broadcast channels generated by the repetition step;
a data modulation step of data-modulating the interleaved broadcast channels; and
a spreading step of multiplying the data-modulated broadcast channels by scrambling codes,
wherein the signal waveform changing step controls the spreading step to multiply the respective data-modulated broadcast channels by different scrambling codes.

* * * * *